(12) United States Patent
Dwiggins et al.

(10) Patent No.: US 11,274,384 B2
(45) Date of Patent: Mar. 15, 2022

(54) LIQUID BARRIER NONWOVEN FABRICS WITH RIBBON-SHAPED FIBERS

(75) Inventors: Carlton F. Dwiggins, Mooresville, NC (US); Pierre D. Grondin, Mooresville, NC (US); Ralph A. Moody, III, Mooresville, NC (US); John F. Steffen, Denver, NC (US)

(73) Assignee: AVINTIV Specialty Materials Inc., Charlotte, NC (US)

( * ) Notice: Subject to any disclaimer, the term of this patent is extended or adjusted under 35 U.S.C. 154(b) by 0 days.

(21) Appl. No.: 13/205,268

(22) Filed: Aug. 8, 2011

(65) Prior Publication Data
US 2013/0041335 A1 Feb. 14, 2013

(51) Int. Cl.
*D04H 13/00* (2006.01)
*B32B 5/26* (2006.01)
(Continued)

(52) U.S. Cl.
CPC ............ *D04H 13/00* (2013.01); *B32B 5/022* (2013.01); *B32B 5/26* (2013.01); *D04H 1/43912* (2020.05);
(Continued)

(58) Field of Classification Search
CPC ....... A61F 15/22; B32B 5/26; B32B 2555/00; B32B 2555/02; D04H 1/4391; D04H 3/018
(Continued)

(56) References Cited

U.S. PATENT DOCUMENTS

| 3,630,816 A | 12/1971 | Parker |
| 4,753,834 A | 6/1988 | Braun et al. |

(Continued)

FOREIGN PATENT DOCUMENTS

| CN | 1708274 A | 12/2005 |
| CN | 101119757 A | 2/2008 |

(Continued)

OTHER PUBLICATIONS

European Search Report, counterpart EPO appln. No. EP12179355, dated Oct. 5, 2012, 2 pages.
(Continued)

*Primary Examiner* — Peter Y Choi
(74) *Attorney, Agent, or Firm* — Burr & Forman LLP

(57) ABSTRACT

A nonwoven fabric useful as a component in a personal hygiene product and a nonwoven personal hygiene component, which is substantially free or free of non-ribbon shaped (e.g., round-shaped) spunbond fibers and includes a meltblown layer between and in direct contact with ribbon-shaped spunbond layers. The meltblown layer has a basis weight of at least about 0.008 gsm and not greater than about 5 gsm, and the nonwoven fabric or component has a basis weight of at least about 8 gsm and not greater than about 40 gsm, a pore size of less than or equal to about 27 microns when measured at 10% of cumulative filter flow. The nonwoven fabric also can have a low surface tension liquid strike through flow of less than 0.9 ml per second, a ratio of low surface tension liquid strike through flow to air permeability of greater than or equal to about 0.016, or both. Personal hygiene articles can incorporate the nonwoven fabric or component.

15 Claims, 5 Drawing Sheets

(51) Int. Cl.
  *D04H 3/018* (2012.01)
  *B32B 5/02* (2006.01)
  *D04H 1/4391* (2012.01)

(52) U.S. Cl.
  CPC ......... *D04H 1/43918* (2020.05); *D04H 3/018* (2013.01); *B32B 2262/0253* (2013.01); *B32B 2307/724* (2013.01); *B32B 2555/00* (2013.01); *B32B 2555/02* (2013.01)

(58) Field of Classification Search
  USPC ....................................................... 442/382
  See application file for complete search history.

(56) References Cited

U.S. PATENT DOCUMENTS

| | | | |
|---|---|---|---|
| 5,085,654 A | 2/1992 | Buell | |
| 5,498,468 A | 3/1996 | Blaney | |
| 6,471,910 B1 | 10/2002 | Haggard et al. | |
| 6,613,704 B1 | 9/2003 | Arnold et al. | |
| 6,815,383 B1 | 11/2004 | Arnold | |
| 7,309,522 B2 | 12/2007 | Webb et al. | |
| 2003/0049988 A1 | 3/2003 | Ortega et al. | |
| 2003/0096114 A1 | 5/2003 | Chen et al. | |
| 2003/0104747 A1 | 6/2003 | Ortega et al. | |
| 2003/0106568 A1 | 6/2003 | Keck et al. | |
| 2003/0129909 A1* | 7/2003 | Zucker | 442/382 |
| 2004/0092900 A1* | 5/2004 | Hoffman | A61F 13/495 604/380 |
| 2004/0216828 A1 | 11/2004 | Ortega et al. | |
| 2005/0101739 A1 | 5/2005 | Webb et al. | |
| 2005/0176326 A1 | 8/2005 | Bond et al. | |
| 2005/0215155 A1 | 9/2005 | Young et al. | |
| 2005/0227563 A1 | 10/2005 | Bond | |
| 2005/0227564 A1 | 10/2005 | Bond et al. | |
| 2006/0012072 A1 | 1/2006 | Hagewood et al. | |
| 2006/0014460 A1* | 1/2006 | Alexander Isele et al. | 442/327 |
| 2006/0141886 A1 | 6/2006 | Brock et al. | |
| 2006/0189956 A1* | 8/2006 | Catalan | 604/385.28 |
| 2009/0246492 A1 | 10/2009 | Bishop et al. | |
| 2011/0196325 A1 | 8/2011 | Isele et al. | |
| 2011/0196327 A1 | 8/2011 | Chhabra et al. | |
| 2011/0196332 A1 | 8/2011 | Cheng et al. | |

FOREIGN PATENT DOCUMENTS

| | | |
|---|---|---|
| WO | 9928122 A1 | 6/1999 |
| WO | 1999028122 A1 | 6/1999 |
| WO | 03016606 A1 | 2/2003 |

OTHER PUBLICATIONS

European Search Report and EPO Form 1703, counterpart EPO appln. No. EP13002352, dated Jul. 8, 2013, 3 pages.
Notification to Grant Patent Right for Invention of corresponding Chinese Application No. 201210276755.5, dated Jun. 28, 2016, all enclosed pages cited.
Office Action issued in Brazilian Patent Application No. BR102012019783-9 dated Jul. 30, 2019, all enclosed pages cited.
Office Action issued in Chinese Patent Application No. 201610817251.8 dated Mar. 4, 2020, all enclosed pages cited.
English translation of Office Action issued in Chinese Patent Application No. 201610817251.8 dated Mar. 4, 2020, all enclosed pages cited.
Second Office Action (with English translation) issued in Chinese Patent Application No. 201610817251.8 dated Aug. 21, 2020, all enclosed pages cited.

* cited by examiner

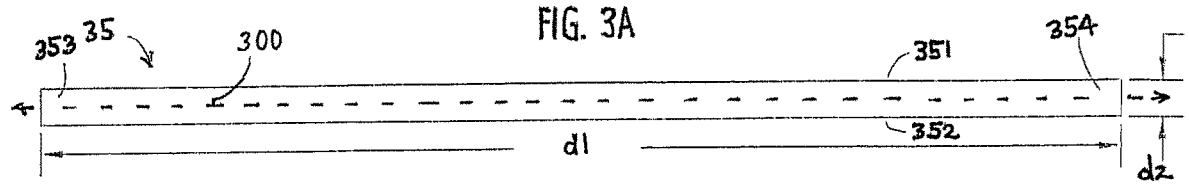
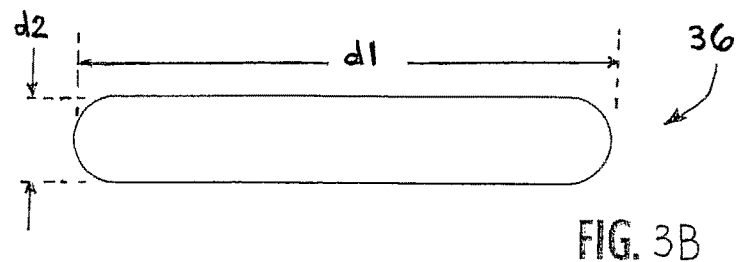
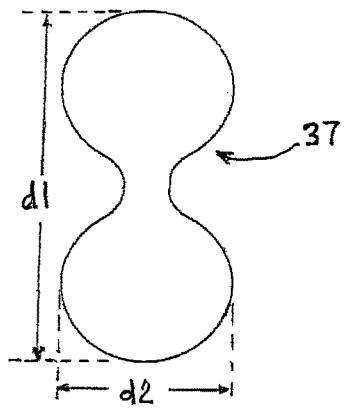
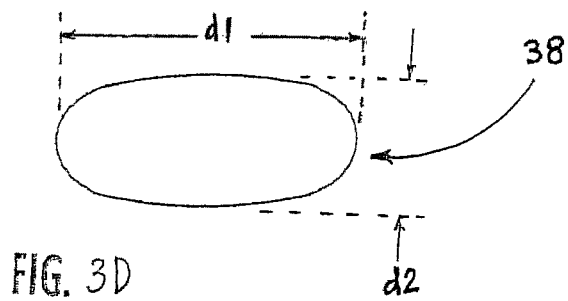
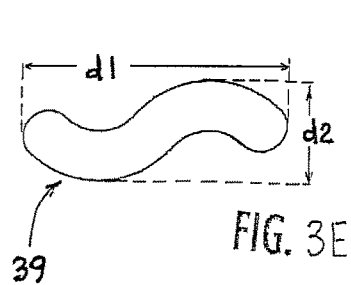
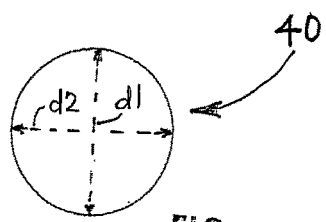

LIQUID BARRIER NONWOVEN FABRICS WITH RIBBON-SHAPED FIBERS

FIELD OF INVENTION

The present invention relates to fibrous nonwoven fabrics that are useful as liquid barrier fabrics in personal hygiene products, and, particularly, nonwoven fabrics that include ribbon-shaped spunbond layers that are in direct contact with at least one intervening meltblown layer. Nonwoven fabrics of this invention exhibit enhanced low surface tension liquid resistance and air permeability.

BACKGROUND

Nonwoven absorbent articles, such as disposable diapers, training pants, incontinent wear, and feminine hygiene products, have used nonwoven fabrics for many purposes, such as liners, transfer layers, absorbent media, backings, and the like. For many such applications, the barrier properties of the nonwoven can serve a significant function. For example, U.S. Pat. No. 5,085,654 to Buell discloses disposable diapers provided with breathable leg cuffs that are formed from material, such as thermoplastic films, which allows passage of vapor while tending to retard the passage of liquid. Buell discloses a cuff having a breathable portion that is different in character from an impermeable portion of the cuff.

Nonwoven fabrics that include fibers or filaments having different cross-sectional shapes have also been disclosed. For example, United States Patent Publ. No. 2005/0215155 A1 to Young et al. discloses in part a laminate comprising a first nonwoven layer comprising first continuous filaments, a second nonwoven layer comprising second continuous filaments, and a third nonwoven layer comprising fine fibers, wherein the first and second continuous filaments have cross-sectional shapes that are distinct from one another.

U.S. Pat. No. 6,471,910 to Haggard et al. discloses a nonwoven fabric formed from a spunbond process by extruding generally ribbon-shaped fibers as defined therein through slot-shaped orifices of a spinneret. Haggard et al. discloses nonwoven webs or fabrics composed solely of the ribbon-shaped fibers as defined therein and discloses the fibers can be used in combination with fibers of other transverse cross-sections and in combination with other technologies to form composite materials, such as meltblown or film composites without illustration or reference to a laminate having a structure of two spunbond layers surrounding a meltblown layer or specific improved low surface tension liquid resistance or air permeability.

United States Patent Publ. No. 2005/0227563 A1 to Bond discloses a fibrous fabric including at least one layer comprising a mixture of shaped fibers having two or more different cross-sections. Bond discloses a laminate with at least one first layer comprising a mixture of shaped fibers having cross-sectional shapes that are distinct from one another and at least one second layer comprising different fibers that are not identical in cross-sectional shape and ratio to the fibers in the first layer.

U.S. Pat. No. 7,309,522 to Webb et al. discloses fibers, elastic yarns, wovens, nonwovens, knitted fabrics, fine nets, and articles produced from fibers comprising a styrenic block copolymer. Webb et al. discloses the shape of the fiber can vary widely, wherein a typical fiber has a circular cross-sectional shape, but sometimes fibers have different shapes, such as tri-lobal shape, or what is said to be a flat 'ribbon' like shape, which may be included in a three layer spunbond-meltblown-spunbond "sandwich". Webb et al. does not disclose the improvement of low surface tension liquid resistance or air permeability.

U.S. Pat. No. 5,498,468 to Blaney discloses a method of making a flexible fabric composed of a fibrous matrix of ribbon-like, conjugate, spun filaments. Blaney discloses applying a flattening force to the fibrous matrix to durably distort the core of individual filaments into a ribbon-like configuration as characterized in the reference. Blaney also discloses a method that includes drawing the extruded conjugate filaments as they are being quenched and applying a flattening force to durably distort the core of individual filaments into a ribbon-like configuration of the reference.

United States Patent Publ. No. 2006/0012072 A1 to Hagewood et al. discloses a fibrous product including a mixture of different shaped fibers that are formed using a spin pack assembly including a spinneret with at least two spinneret orifices having different cross-sections. Hagewood et al. shows a fibrous web containing a mixture of multi-component solid round, monocomponent trilobal fibers, and meltblown fibers in examples.

U.S. Pat. No. 6,613,704 B1 to Arnold et al. discloses nonwoven webs of continuous filaments having a mixture or blend of first and second continuous filaments, wherein the second continuous filaments are different from the first continuous filaments in one or more respects such as size, cross-sectional shape, polymer composition, crimp level, wettability, liquid repellency, and charge retention. Arnold et al. discloses that the second continuous filaments can be substantially surrounded by the first continuous filaments wherein the ratio of first continuous filaments to second continuous filaments exceeds about 2:1.

Resistance to low surface tension liquid strike through and breathability are performance characteristics of liquid barrier fabrics. Liquid strike through generally refers to the permeability of liquid through the fabric and breathability generally refers to the permeability to air and vapor through the fabric.

The present inventors have recognized that there is a need for a fabric that can be used in personal hygiene products that achieves a synergistic balance of low surface tension liquid strike through and breathability with unique combinations of fibers and nonwoven fibrous layers having different structures.

SUMMARY

A nonwoven fabric usable as a component in a personal hygiene product is provided which includes a first ribbon-shaped spunbond layer, a second ribbon-shaped spunbond layer and a meltblown layer disposed between the first and second ribbon-shaped spunbond layers. The meltblown layer is in direct contact with the first and second ribbon-shaped spunbond layers. As an option, the meltblown layer can include multiple directly adjoining meltblown sub-layers, which can be present as a stack, wherein the two outer sides of the stack are in direct contact with the first and second ribbon-shaped spunbond layers, respectively. As an option, one or more of the first ribbon-shaped spunbond layer, the second ribbon-shaped spunbond layer and the meltblown layer comprises polypropylene, as defined herein. The meltblown layer comprises meltblown fibers in an amount of at least 0.1% by weight of the nonwoven fabric and not greater than about 40% by weight of the nonwoven fabric, and the meltblown layer has a basis weight no greater than 5 gsm. The nonwoven fabric is substantially free or free of non-ribbon shaped spunbond fibers (e.g., round-shaped spunbond fibers). The nonwoven fabric has a basis weight of at least about 8 grams/m² (gsm) and not greater than about 40 gsm and a pore size measured at 10% of cumulative filter flow of no more than about 27 microns.

As an option, the nonwoven fabric can contain round-shaped spunbond filaments in an amount of less about 10% by weight, or less than about 5% by weight, or less than about 1% by weight, or 0% by weight to about 10% by weight, or lesser range amounts, such as disclosed herein, with respect to the entire nonwoven fabric. As another option, the first and second ribbon-shaped spunbond layers comprise fibers having a cross-section with an aspect ratio greater than about 1.5:1, or from about 1.55:1 to about 7:1, or from about 1.6:1 to about 7:1, or from about 1.75:1 to about 7:1, or from about 2.5:1 to about 7:1, or other values such as disclosed herein. As another option, the nonwoven fabric has a pore size measured at 25% of cumulative filter flow of less than about 23 microns.

As another option, the nonwoven fabric has an air permeability of at least about 10 m³/m²/min or other values such as disclosed herein. As another option, the nonwoven fabric can have a low surface tension liquid strike through flow of less than 0.9 ml per second, or less than 0.8 ml per second, or other values such as disclosed herein. As another option, the meltblown layer of the nonwoven fabric has a basis weight of at least about 0.3 gsm and no greater than about 5 gsm, or at least about 0.4 gsm and no greater than about 4 gsm, or at least about 0.7 gsm and no greater than about 2 gsm, or other values such as disclosed herein. As another option, the nonwoven fabric has a basis weight of at least about 8.5 gsm and not greater than about 30 gsm, or at least about 11 gsm and not greater than about 25 gsm, or other values such as disclosed herein. As another option, the first and second spunbond layers and the meltblown layer are bonded together by a plurality of discrete bond areas. As another option, the discrete bond areas can be thermal bonds formed as a plurality of bond points wherein the plurality of bond points comprise up to about 25% of the surface area of nonwoven fabric, such as from about 10% to about 25% of the surface area of the nonwoven fabric, or other percentages such as disclosed herein.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention. Features having the same referencing numeral in the various figures represent similar elements unless indicated otherwise. The figures and features depicted therein are not necessarily drawn to scale.

BRIEF DESCRIPTION OF DRAWINGS

FIGS. 3A-F illustrate cross-sectional enlarged views of several different shapes of fibers, wherein FIGS. 3A-E showing various ribbon-shaped fibers in accordance with embodiments of the present invention.

DEFINITIONS

Figure 1:
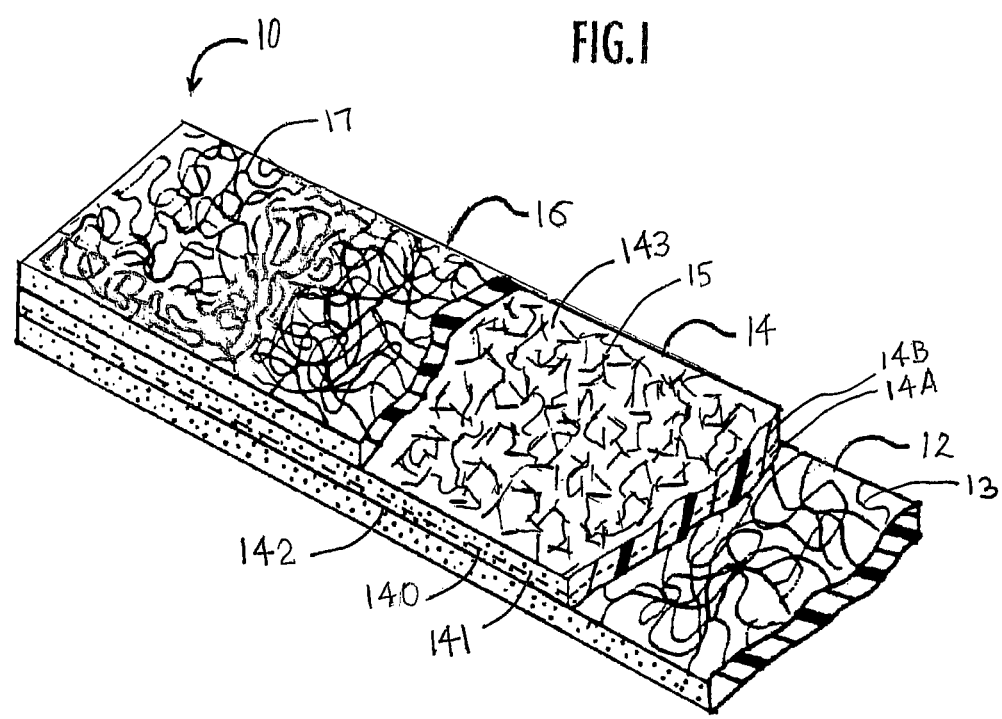
FIG. 1 is a perspective view of a nonwoven fabric useable in a personal hygiene product in accordance with an embodiment of the invention.

As used herein, the term "fiber(s)" generally can refer to continuous filaments, substantially continuous filaments, staple fibers, and other fibrous structures having a fiber length that is substantially greater than its cross-sectional dimension(s).

As used herein, the term "continuous filament(s)" refers to a polymer strand or polymer fiber that is not broken during the regular course of formation.

As used herein, the term "fine fiber(s)" refers to discrete polymer fibers or strands with an average dimension d1, as defined herein, not to exceed about 10 μm.

As used herein, the term "ribbon-shaped" refers to a cross-sectional geometry and aspect ratio. With respect to the cross-sectional geometry, "ribbon-shaped" refers to a cross-section that includes at least one pair (set) of symmetrical surfaces. For example, the cross section can be a polygon which includes two different pairs of opposite symmetrical surfaces or only one set thereof. For example, with reference to FIG. 3A for sake of illustration and not limitation, the overall shape 35 has an imaginary major bisector 300, and a minor bisector (not shown), which is perpendicular to the major bisector, wherein opposite surfaces 351 and 352 are symmetrical surfaces with respect to each other with reference to the imaginary bisector 300. Other ribbon-shape geometries having at least one set of symmetrical surfaces are illustrated, for example, in FIGS. 3B-3E. The major bisector 300 can be straight (e.g., FIGS. 3A-3D), curvilinear (e.g., FIG. 3E), or other shapes, depending on the cross-sectional shape of the fiber. "Ribbon-shaped" can include, for example, a shape having two sets of parallel surfaces forming a rectangular shape (e.g. FIG. 3A). "Ribbon-shaped" can also include, for example, a cross-section having one set of parallel surfaces, which can be joined to one another by shorter rounded end joints having a radius of curvature (e.g., FIG. 3B). "Ribbon-shaped" additionally can include, for example, "dog-bone" shaped cross-sections, such as illustrated in FIG. 3C, and oval or elliptical shaped cross-sections, such as illustrated in FIG. 3D. In these cross-sections illustrated in FIGS. 3C and 3D, the term "ribbon-shaped" refers to a cross-section that includes sets of symmetrical surfaces which comprise rounded (e.g. curvilinear or lobed) surfaces, that are oppositely disposed. As illustrated in FIG. 3D, the oval shaped cross-sections can have rounded or curvilinear type top and bottom symmetrical surfaces, which are joined to one another by shorter rounded end joints at the sides having a relatively smaller radius of curvature than the top and bottom symmetrical surfaces. The term "ribbon-shaped" also includes cross-sectional geometry that includes no more than two square ends, or round ends, or "lobes" along the perimeter of the cross-section. FIG. 3C, for example, shows a bi-lobal cross-section. The lobes differ from the indicated rounded end joints included in the cross-sections such as shown in FIGS. 3B and 3D referred to above. Surface irregularities like bumps or striations or embossed patterns that are relatively small when compared to the perimeter of the cross-section, or are not continuous along the length of the fibers are not included in the definition of "lobes," or the rounded end joints. It can also be understood that the above definition of "ribbon-shaped" covers cross-sectional geometries in which one or more of the sets of surfaces (e.g., the opposite lengthwise surfaces) are not straight (e.g. FIG. 3E), provided such cross-sectional geometries meet the aspect ratio requirements as defined below.

With respect to aspect ratio, a "ribbon-shaped" cross-section has an aspect ratio (AR) of greater than 1.5:1. The aspect ratio is defined as the ratio of dimension d1 and dimension d2. Dimension d1 is the maximum dimension of a cross-section, whether ribbon-shaped or otherwise, measured along a first axis. Dimension d1 is also referred to as the major dimension of the ribbon-shaped cross-section. Dimension d2 is the maximum dimension of the same cross-section measured along a second axis that is perpendicular to the first axis that is used to measure dimension d1, where dimension d1 is greater than dimension d2. Dimension d2 is also referred to as the minor dimension. As an option, the major bisector 300 can lie along the first axis and the minor bisector (not shown) can lie along the second axis. Examples of how dimensions d1 and d2 are measured are illustrated in FIGS. 3A, 3B, 3C, 3D, and 3E, which illustrate ribbon-shaped cross-sections and in FIG. 3F which illustrates a non-ribbon-shaped cross-section as described below. Aspect ratio is calculated from the normalized ratio of dimensions d1 and d2, according to formula (I):

$$AR=(d1/d2):1 \qquad (1)$$

The units used to measure d1 and d2 are the same.

The term "ribbon-shaped" excludes for example, cross-sectional shapes that are round, circular or round shaped as defined herein. As referred to herein, the terms "round", "circular" or "round-shaped" refer to fiber cross-sections that have an aspect ratio or roundness of 1:1 to 1.5:1. An exactly circular or round fiber cross-section has an aspect ratio 1:1 which is less than 1.5:1. Any fiber that does not meet the indicated criteria for "ribbon-shaped" fiber as defined herein is "non-ribbon shaped". Other non-ribbon shaped fibers include, for example, square, tri-lobal, quadri-lobal, and penta-lobal cross-sectional shaped fibers. For example, a square shaped cross-section has an aspect ratio of 1:1 which is less than 1.5:1. A tri-lobal cross-section fiber, for example, has three round ends or "lobes", and thus does not meet the definition for "ribbon-shaped" cross-section. Illustrations of some of these shapes and the manners of evaluating the aspect ratios thereof in accordance with embodiments are included herein.

As used herein, a "nonwoven(s)" refers to a fiber-containing material which is formed without the aid of a textile weaving or knitting process.

As used herein, the terms "nonwoven fabric" or "nonwoven component" may be used interchangeably and refer to a nonwoven collection of polymer fibers or filaments in a close association to form one or more layers, as defined herein. The one or more layers of the nonwoven fabric or nonwoven component can include staple length fibers, substantially continuous or discontinuous filaments or fibers, and combinations or mixtures thereof, unless specified otherwise. The one or more layers of the nonwoven fabric or nonwoven component can be stabilized or unstabilized.

As used herein, the term, "spunmelt" refers to methods of producing nonwovens by extruding polymer into fibers or filaments and bonding the fibers or filaments thermally, chemically, or mechanically.

As used herein, the term "absorbent article(s)" refers to devices that absorb and contain liquid, and more specifically, refers to devices that are placed against or in proximity to the body of the wearer to absorb and contain the various exudates discharged from the body.

As used herein, the term, "personal hygiene product" refers to any item that can be used to perform a personal hygiene function or contribute to a hygienic environment of an individual. Personal hygiene products of the invention include, but are not limited to, diapers, training pants, absorbent underpants, incontinence articles, feminine hygiene products (e.g., sanitary napkins), medical protective barrier articles, such as garments and drapes, sterilization wraps and foot covers.

The term "personal hygiene component" refers to a nonwoven component of a personal hygiene product, for example, a leg cuff used in a diaper, training pants, absorbent underpants or incontinence article, or other segment of a feminine hygiene product, or medical protective barrier article are personal hygiene components.

The term "dimension" is a measurement of the cross-section of the fibers described herein. In instances where the fiber has a round or circular cross-section, the dimension of the fiber will be the same as the diameter of the fiber.

The term "spunbond" or "S" may be used interchangeably with "continuous filament(s) or fiber(s)" and refers to fibers or filaments which are formed by extruding a molten material as filaments from a plurality of fine capillaries in a spinneret, and the dimension of the extruded filaments then may be reduced by drawing or other known methods. The term "spunbond" also includes fibers that are formed as defined above, and which are then deposited or formed in a layer in a single step.

The term "meltblown" or "M" may be used interchangeably with "fine fibers" or "discontinuous fibers" and refers to fibers formed by extruding a molten material and drawing the extruded molten material with high-velocity fluid into fibers having dimension d1, as defined herein, of less than 10 microns, or more specifically less than 5 microns or even more specifically, less than 2 microns. The term "meltblown" also includes fibers that have a round cross-sectional geometry and an aspect ratio of less than 1.5:1. The term "meltblown" also includes fibers that are described as not continuous, in contrast to spunbond fibers. The term "meltblown" also includes fibers formed by a process in which molten material is extruded through a plurality of fine die capillaries into a high-velocity gas stream which attenuates the fibers of molten material to reduce their dimensions to a dimension d1 of less than about 10 microns or, more specifically, a dimension d1 of less than about 3 microns.

As used herein, a "sub-layer" is defined as similar material or similar combination of materials formed from a single production beam, wherein the material exists in at least one major plane (e.g., an X-Y plane) with a relatively smaller thickness extending in the orthogonal direction thereto (e.g., in a Z direction thereto). The fibers of a sub-layer, for example, may include only spunbond fibers, only meltblown fibers or only a single type of fibers. As used herein, a "layer" is defined as one or more sub-layers comprising fibers made from the same resin and fibers that are defined as the same type of fiber (e.g., only spunbond, only meltblown or only another type of fiber).

The term "component" is used herein to refer to a segment or portion of an article or product.

As used herein, a "laminate" generally refers to at least two joined together nonwoven layers contacting along at least a portion of adjoining faces thereof with or without interfacial mixing.

As used herein, "substantially free," as used with respect to the content of round-shaped fibers in a nonwoven fabric, refers to less than 10% by weight based on the total weight of the nonwoven fabric.

As used herein, "comprising" or "comprises" is synonymous with "including," "containing," "having", or "characterized by," and is open-ended and does not exclude additional, unrecited elements or method steps, and thus should be interpreted to mean "including, but not limited to . . . ".

As used herein, "consisting of" excludes any element, step, or ingredient not specified.

As used herein, "consisting essentially of", refers to the specified materials or steps and those that do not materially affect the basic and novel characteristic(s) of the nonwoven fabrics of the invention as described herein.

DETAILED DESCRIPTION

The present invention is directed to a nonwoven fabric usable as a component in a personal hygiene product. The nonwoven fabric has at least one meltblown layer disposed between and in direct contact with ribbon-shaped spunbond layers. The nonwoven fabric is at least substantially free of non-ribbon shaped spunbond fibers (e.g., round-shaped spunbond fibers), such as less than 10% by weight of the fabric is non-ribbon shaped spunbond fiber.

Improved Performance Characteristics of Nonwoven Fabric

A benefit of this invention, and such as shown in the examples, is the provision of better resistance to low surface tension liquid when compared to a nonwoven fabric of similar general construction but made from round-shaped spunbond fibers in the spunbond layers. Further, nonwoven fabrics have been developed in the present invention which can be used, for example, as a barrier layer in a diaper or other personal hygiene products that have synergistic barrier properties when encountering low surface tension liquids of types which are commonly encountered in such uses, while being air and moisture vapor breathable and manufacturable at low cost. Breathability is an important consideration as air and vapor movement through the fabric is associated with wearer comfort. The nonwoven fabrics of the present invention can provide enhanced breathability without compromising liquid barrier properties.

It has been found that examples of similar nonwoven fabric construction comprising meltblown fibers and spunbond fibers that are round-shaped perform differently than those that are ribbon-shaped in regard to air permeability and resistance to penetration by low surface tension liquid (referred to herein as "LSTST-Flow"). It has been observed, for example, that the ratio of LSTST-Flow to air permeability (referred herein as "Flow Ratio") can be affected by the selected materials and design of the nonwoven fabric and fibers in previously unrecognized manners. It has been demonstrated, for example, that there is a superior range of construction involving a synergistic combination of meltblown fibers and ribbon-shaped spunbond fibers in adjoining layers, wherein the resistance to liquid flow can be increased with less reduction in air permeability. It has been found, for example, that the use of ribbon-shaped spunbond fibers in spunbond layers that sandwich meltblown layer(s) having a restricted total content of meltblown fibers, wherein the meltblown fiber web formation is designed to have provide a nonwoven fabric with a pore size measured at 10% of cumulative filter flow of no more than about 27 microns and/or a pore size measured at 25% cumulative filter flow of less than 23 microns, can yield unique beneficial effects on the breathability and liquid barrier properties of the nonwoven fabric.

As an option, a nonwoven fabric that has a reduced Flow Ratio can be provided, which includes a meltblown layer or meltblown layers having a total basis weight of at least about 0.008 gsm and no greater than about 5 gsm, as sandwiched between spunbond layers comprising ribbon-shaped spunbond fibers in a nonwoven fabric that has a total basis weight of at least about 8 gsm and not greater than about 40 gsm.

As an option, a nonwoven fabric is provided that has an air permeability of at least about 9 $m^3/m^2/min$, or at least about 10 $m^3/m^2/min$, or at least about 15 $m^3/m^2/min$, or at least about 20 $m^3/m^2/min$, or at least about 25 $m^3/m^2/min$, or at least about 30 $m^3/m^2/min$, or at least about 35 $m^3/m^2/min$, or at least about 40 $m^3/m^2/min$, or at least about 45 $m^3/m^2/min$, or at least about 50 $m^3/m^2/min$, or greater values. As an option, a nonwoven fabric is provided that has an air permeability of at least about 9 $m^3/m^2/min$ to no greater than 140 $m^3/m^2/min$, or at least about 12 $m^3/m^2/min$ to no greater than about 130 $m^3/m^2/min$, or at least about 15 $m^3/m^2/min$ to no greater than about 120 $m^3/m^2/min$, or at least about 20 $m^3/m^2/min$ to no greater than about 110 $m^3/m^2/min$, or at least about 25 $m^3/m^2/min$ to no greater than about 100 $m^3/m^2/min$, or at least about 30 $m^3/m^2/min$ to no greater than about 95 $m^3/m^2/min$, or at least about 40 $m^3/m^2/min$ to no greater than about 90 $m^3/m^2/min$, or at least about 45 $m^3/m^2/min$ or no greater than about 85 $m^3/m^2/min$, or at least about 50 $m^3/m^2/min$ to no greater than about 80 $m^3/m^2/min$, or other ranges within these values.

As another benefit of these constructions, the nonwoven fabric can have a LSTST-Flow of less than 0.9 ml per second, or less than 0.8 ml per second, or less than 0.7 ml per second, or less than 0.6 ml per second, or less than 0.5 ml per second, or less than 0.4 ml per second, or less than 0.3 ml per second, or lower range values.

As a further option, a nonwoven fabric is provided that has a Flow Ratio of less than or equal to about 0.06, or less than or equal to about 0.058, or less than or equal to about 0.056, or less than or equal to about 0.054, or less than or equal to about 0.052, or less than or equal to about 0.05, or less than or equal to about 0.048, or less than or equal to about 0.046, or less than or equal to about 0.044, or less than or equal to about 0.042, or less than or equal to about 0.04, or less than or equal to about 0.038, or less than or equal to about 0.036, or less than or equal to about 0.034, or less than or equal to about 0.032, or less than or equal to about 0.030, or less than or equal to about 0.028, or less than or equal to about 0.026, or less than or equal to about 0.024, or less than or equal to 0.023, or less than or equal to 0.022, or lesser range values, or from at least about 0.015 to no greater than about 0.06, or from at least about 0.015 to no greater than about 0.058, or from at least about 0.015 to no greater than about 0.056, or from at least about 0.015 to no greater than about 0.054, or from at least about 0.015 to no greater than about 0.052, or from at least about 0.015 to no greater than about 0.050, or from at least about 0.018 to no greater than about 0.04, or from at least about 0.018 to no greater than about 0.035, or from at least about 0.018 to no greater than about 0.030, from at least about 0.018 to no greater than about 0.025, or from at least about 0.019 to no greater than about 0.025, or from at least about 0.019 to no greater than about 0.024, from at least about 0.019 to no greater than about 0.023, or at least about 0.019 to no greater than about 0.022 or other ranges within these values. As another benefit of these constructions, any of these reduced LSTST-Flow to air permeability ratios can be provided in a nonwoven fabric of the present invention which has a pore size measured at 10% of cumulative filter flow of no more than about 27 microns or at 25% cumulative filter flow of no more than 23 microns. As another option, any of these reduced Flow Ratios can be provided in a nonwoven fabric of the present invention which has a pore size measured at 10% of cumulative filter flow of no more than about 25 microns, or no more than 23 microns or no more than 21 microns.

Nonwoven Fabric Structure

FIG. 1 illustrates a nonwoven fabric of an option of the present invention in a perspective view with cut-aways to show detail. The three or four layer nonwoven fabric 10 shown in FIG. 1 can be created from the forming machine described with respect to FIG. 2 herein. In FIG. 1, the nonwoven fabric 10 has a first ribbon-shaped spunbond layer 12 of first ribbon-shaped spunbond fibers 13 (e.g., continuous spunbond filaments), a meltblown layer 14 of meltblown fibers 15, and a second ribbon-shaped spunbond layer 16 of second ribbon-shaped spunbond fibers 17 (e.g., continuous spunbond filaments). As illustrated in FIG. 1, the first ribbon-shaped spunbond layer 12, meltblown layer 14, and second ribbon-shaped spunbond layer 16 are in direct contact with the respective adjoining layer or layers to each of them. As used herein, the wording "direct contact" between a ribbon-shaped spunbond layer (12 or 16) and a meltblown layer 14, or between meltblown sub-layers 14A and 14B if used, can mean that at least about 50%, or at least about 60%, or at least about 70%, or at least about 80%, or at least about 90%, or at least about 95%, or at least about 99%, or 100%, of the surfaces areas of the adjacent faces of the two respective layers are in physical contact with each other (e.g., contact areas are free of interposed different materials or air pockets that space the surfaces of the adjoining layers apart).

The first ribbon-shaped spunbond layer 12 comprised of first ribbon-shaped spunbond fibers 13 can have a basis weight, for example, of at least about 3.9 gsm and not greater than about 19.5 gsm, or at least 4.1 gsm and not greater than about 13 gsm, or at least about 5.1 gsm and not greater than about 11.5 gsm, or at least about 5 gsm and not greater than about 6.5 gsm, or at least about 5.5 gsm and no greater than about 6.25 gsm or other ranges amounts within these ranges. As another option, the first ribbon-shaped spunbond layer 12 comprised of first ribbon-shaped spunbond fibers 13 can have a basis weight, for example, 6 gsm. As an option, the first ribbon-shaped spunbond layer 12 can comprise first ribbon-shaped spunbond fibers 13 with denier (g/9,000 m) in the range, for example, of from about 1.0 to about 4.0, or from about 1.0 to about 3.5, or from about 1.0 to about 3.2, or from about 1.0 to about 2.8, or from about 1.0 to about 2.4, or from about 1.0 to about 2.0, or other denier values. As another option, the first ribbon-shaped spunbond layer 12 can comprise first ribbon-shaped spunbond fibers 13 having an average dimension d1 of greater than about 12.5 µm, or from about 12.5 µm to about 50 µm, or from about 12.5 µm to about 40 µm, or from about 12.5 µm to about 30 µm, or from about 12.5 µm to about 28 µm, or other values. The dimension d1 can be determined, for example, as part of the aspect ratio measurements which are described in the examples section herein.

As indicated, the first ribbon-shaped spunbond fibers 13 can have cross-sectional shapes including, but not limited to, shapes selected from the group consisting of flat, oval, bi-lobal, rectangular, and any combinations thereof. As an option, the first ribbon-shaped spunbond fibers 13 can all have the same cross-sectional geometry (e.g., all rectangular, or all bi-lobal, or all flat, or all oval) with respect to each other within the indicated required range for ribbon-shaped fibers. As another option, the first ribbon-shaped spunbond fibers 13 can have the same or different aspect ratios with respect to each other within the indicated required range for ribbon-shaped fibers. As another option, the first ribbon-shaped spunbond fibers can have the same cross-sectional geometry and the same aspect ratio with respect to each other, with both the cross-sectional geometry and aspect ratio being within the indicated required range for ribbon-shaped fibers. For example, the first ribbon-shaped spunbond fibers 13 can all comprise rectangular cross-sectional geometry, wherein the aspect ratio is 2:1 for all of the fibers. As another option, the first ribbon-shaped spunbond fibers can have the same cross-sectional geometry but different aspect ratio with respect to each other. For example, the first ribbon-shaped spunbond fibers 13 can have the same rectangular cross-section while the aspect ratio first ribbon-shaped spunbond fibers 13 can vary, e.g., in a range from about 1.75:1 to about 2.25:1, or other aspect ratio values within the indicated required criterion (i.e., AR>1.5:1). Where the aspect ratios may vary, the denier of the first ribbon-shaped spunbond fibers also can vary.

The nonwoven fabric 10 further comprises a second ribbon-shaped spunbond layer 16 which is comprised of second ribbon-shaped spunbond fibers 17. The second ribbon-shaped spunbond layer 16 can have a basis weight in the ranges indicated for the first ribbon-shaped spunbond layer 12. As options, the second ribbon-shaped spunbond fibers 17 in the second ribbon-shaped spunbond layer 16 can have cross-sectional geometries, aspect ratios, denier, dimension d1 values, average dimension d1 values and combinations thereof that are similar to that indicated for the first ribbon-shaped spunbond fibers 13 of the first ribbon-shaped spunbond layer 12. As an option, the second ribbon-shaped spunbond fibers 17 may have the same cross-sectional geometry and the same aspect ratio with respect to each other. As another option, the second ribbon-shaped spunbond fibers can have the same cross-sectional geometry but different aspect ratio with respect to each other.

As an option, the cross-sectional geometry and/or aspect ratios selected and used for the first and second ribbon-shaped spunbond fibers 13 and 17 in one of the first and second ribbon-shaped spunbond layers 12 and 16, respectively, can be the same with respect to the other ribbon-shaped spunbond layer (12 or 16). For example, as an option, both the first and second ribbon-shaped spunbond layers 12 and 16 can contain ribbon-shaped spunbond fibers 13 and 17, respectively, having rectangular cross-sectional geometries and/or similar aspect ratios with respect to each other. Alternatively, one of the first and second ribbon-shaped spunbond layers 12 and 16 can include ribbon-shaped spunbond fibers 13 and 17, respectively, with different aspect ratios from the ribbon-shaped spunbond fibers (13 or 17) of the other of the first and second ribbon-shaped spunbond layers (12 or 16). As yet another option, the first spunbond layer 12 has first ribbon-shaped spunbond fibers 13 with a mixture of aspect ratios of, while the second spunbond layer 16 has second ribbon-shaped fibers 17 having a single aspect ratio or a different mixture of aspect ratios than the first ribbon-shaped spunbond fibers 13.

As an option, the number of different aspect ratios of the ribbon-shaped spunbond fibers allowed in a single ribbon-shaped spunbond layer is controlled. As an option, each of the first ribbon-shaped spunbond layer 12 and second ribbon-shaped spunbond layer 16 can comprise similar ribbon-shaped spunbond fibers with respect to aspect ratios in an amount of at least about 90% by weight, or at least about 91% by weight, or at least about 92% by weight, or at least about 93% by weight, or at least about 94% by weight, or at least about 95% by weight, or at least about 96% by weight, or at least about 97% by weight, or at least about 98% by weight, or at least about 99% by weight, or 100% by weight, of the total fiber content of each respective ribbon-shaped spunbond layer.

The nonwoven fabric 10 can include more than two ribbon-shaped spunbond layers. As an option, the additional ribbon-shaped spunbond layers can include ribbon-shaped spunbond fibers having the same or different cross-sectional geometries and/or aspect ratios as the first and/or second ribbon-shaped fibers 13 or 17 as described herein. The additional ribbon-shaped spunbond layers can be disposed to be in direct contact with either the first or second ribbon-shaped spunbond layers 12 or 16, respectively. It will be understood that the total amount of the ribbon-shaped spunbond fibers in the additional ribbon-shaped spunbond layers will be consistent with basis weights and basis weight percentages disclosed herein. As an option, the nonwoven fabric 10 excludes non-ribbon shaped spunbond fibers.

As also indicated in FIG. 1, the nonwoven fabric 10 comprises a meltblown layer 14 which itself is comprised of meltblown fibers 15. The meltblown layer 14 can have a basis weight, for example, of from at least about 0.008 gsm to no greater than about 5 gsm, or from at least about 0.4 gsm to no greater than about 4 gsm, or from at least about 0.7 gsm to no greater than about 2 gsm, or from at least about 1.0 gsm to no greater than about 2 gsm, or from at least about 1.1 gsm to no greater than about 1.7 gsm, or from at least about 1.2 gsm to no greater than about 1.4 gsm or from at least about 0.5 gsm to no greater than about 4 gsm, or from at least about 0.6 gsm to no greater than about 3 gsm, or other values within these ranges. As an option, the meltblown layer 14 can comprise meltblown fibers 15 having an average dimension d1 that does not exceed about 10 μm, or does not exceed about 7.5 μm, or does not exceed about 5 μm, or does not exceed 3 um or does not exceed 1.8 um, or is from about 0.3 to about 10 μm, or is from about 1 to about 10 μm, or is from about 1 to about 7.5 μm, or is from about 0.5 to about 5 μm, or other ranges within these values. As an option, two or more meltblown sub-layers 14A and 14B of meltblown fibers 15A and 15B can be used to form the meltblown layer 14 and can be disposed between first and second ribbon-shaped spunbond layers 12 and 16, respectively. The meltblown sub-layers 14A and 14B, if used, can have an interface 140, which is indicated by the dashed line in FIG. 1. One meltblown sub-layer 14B can be provided in direct contact with the second meltblown sub-layer 14A. Although one or two meltblown layers are illustrated in FIG. 1 as used in nonwoven fabric 10, additional meltblown sub-layers (e.g., three, four, etc.) can be disposed between the ribbon-shaped spunbond layers 12 and 16, respectively.

Where multiple directly adjoining meltblown sub-layers are present as a stack 141, such as illustrated by sub-layers 14A and 14B, the two outer sides 142 and 143 of the stack 141 are in direct contact with the first and second ribbon-shaped spunbond layers 12 and 16, respectively. As an option, if three or more meltblown sub-layers are used (not shown), the two outermost meltblown sub-layers of the stack can have an outer side that directly contacts an adjoining ribbon-shaped spunbond layer (12 or 16) and an inner side in contact with the middle or intermediate meltblown sub-layer or layers of the same stack, which are spaced from the ribbon-shaped spunbond layers (12 and 16). If two or more meltblown sub-layers are used, then the previously described meltblown basis weights apply to combined total basis weights of the two or more meltblown sub-layers or to the whole meltblown layer 14 made from the various meltblown sub-layers. For example, if three meltblown sub-layers are used, the total combined basis weight of the three meltblown sub-layers can be, for example, from at least about 0.008 gsm to no greater than about 5 gsm, or the other indicated ranges. The meltblown sub-layers 14A and 14B, if used, can have similar fiber and web features and materials as described for the meltblown layer 14, however, the indicated calculation of meltblown sub-layer basis weights will be based on their combined values. As illustrated in FIG. 1, the first ribbon-shaped spunbond layer 12, the meltblown sub-layers 14A and 14B or meltblown layer 14, and the second ribbon-shaped spunbond layer 16 are in direct contact with their adjoining layer or layers. In an option, the meltblown layer 14, or meltblown sub-layers 14A and 14B if used, comprise fine fibers in amount of at least about 80% by weight, or at least 85% by weight, or at least 90% by weight, or at least 91% by weight, or at least 92% by weight, or at least 93% by weight, or at least 94% by weight, or at least 95% by weight, or at least 96% by weight, or at least 97% by weight, or at least 98% by weight, or at least 99% by weight, or 100% by weight, based on the total basis weight of the meltblown layer 14 or each respective meltblown sub-layer 14A and 14B, as applicable.

The resultant nonwoven fabric 10 has the meltblown layer 14 (or meltblown sub-layers 14A and 14B) interposed between the first and second ribbon-shaped spunbond layers 12 and 16. The nonwoven fabric 10 can be consolidated by mechanic embossing methods or other nonwoven fabric consolidation methods, which are illustrated in greater detail with respect to FIG. 2 herein. As an option, the nonwoven fabric 10 having a first ribbon-shaped spunbond layer 12, meltblown layer 14 (or meltblown sub-layers 14A and 14B), and second ribbon-shaped spunbond layer 16, contains less than about 10% by weight, or less than about 9% by weight, or less than about 8% by weight, or less than about 7% by weight, or less than about 6% by weight, or less than about 5% by weight, or less than about 4% by weight, or less than about 3% by weight, or less than about 2% by weight, or less than about 1% by weight, or 0% by weight, or from 0% to about 10% by weight, from 0% to about 7% by weight, from 0% to about 5% by weight, or from 0% to about 3% by weight, from 0% to about 2% by weight, from 0% to about 1% by weight, of total non-ribbon shaped spunbond fibers based on the total basis weight of the nonwoven fabric. As another option, these ranges also can apply specifically to round-shaped spunbond fibers. As another option, these restrictive amounts of the non-ribbon shaped or round-shaped spunbond fibers in particular also can apply to each the respective basis weights of the first or second ribbon-shaped spunbond layers 12, 16 and meltblown layer 14 or to combinations of the respective basis weights of the first or second ribbon-shaped spunbond layers 12, 16 and meltblown layer 14.

As another option, the nonwoven fabric 10 can exclude the presence of any intervening component between the meltblown layer 14 or the stack 141 of meltblown sub-layers 14A, 14B and the first or second ribbon-shaped spunbond layers 12 or 16. The intervening component may include layer of non-ribbon shaped spunbond fibers, such as round spunbond fibers or other fibers that cannot be characterized as a ribbon-shaped spunbond fiber or meltblown fiber. In addition, as another option, the nonwoven fabric 10 can exclude an intervening component, as defined above, between the meltblown sub-layers 14A and 14B, if used. The exclusion of an intervening component is subject to the disclosure herein of the direct contact between the ribbon-shaped spunbond layers 12 and 16 and meltblown layer 14 or meltblown sub-layers 14A and 14B, if used.

As another option, the meltblown layer 14, or meltblown sub-layers 14A and 14B if used, contains meltblown fibers in a total amount of at least 0.1% by weight to no greater than 40% by weight of the nonwoven fabric (e.g., with reference to nonwoven fabric 10), or at least 0.5% by weight to no greater than 40% by weight of the nonwoven fabric, at least 1% by weight to no greater than 40% by weight of the nonwoven fabric, or at least 2% by weight to no greater than 30% by weight of the nonwoven fabric, or at least 3% by weight to no greater than 25% by weight of the nonwoven fabric, or at least 4% by weight to no greater than 20% by weight of the nonwoven fabric, or at least 5% by weight to no greater than 15% by weight of the nonwoven fabric, or other range values within these ranges. As an option, the meltblown layer 14, or meltblown sub-layers 14A and 14B if used, contains meltblown fibers in a total amount of about 10% by weight of the nonwoven fabric. The total basis weight of the nonwoven fabric 10 can be, for example, at least about 8 gsm and not greater than about 40 gsm, or at least 8.5 gsm and not greater than about 35 gsm, or at least about 9 gsm and not greater than about 30 gsm, or at least about 10 gsm and not greater than about 25 gsm, or at least about 11 gsm and not greater than about 15 gsm, or at least about 12 gsm and not greater than about 14 gsm, or other ranges amounts within these ranges, regardless of whether the nonwoven fabric 10 includes three, four or more layers.

Manufacture of Nonwoven Fabric

Figure 2:
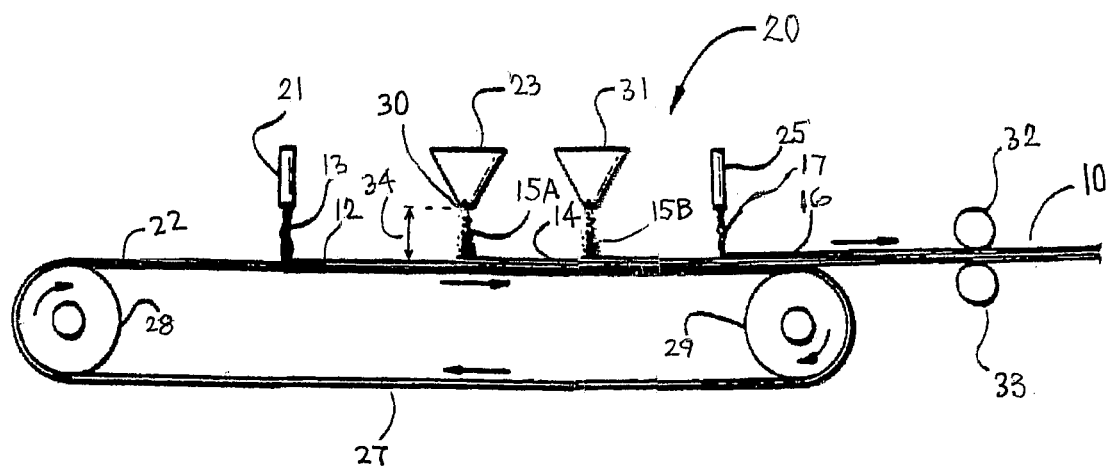
FIG. 2 is a schematic diagram of a forming system used to make a nonwoven fabric in accordance with an embodiment of the present invention.

With reference to FIG. 2, a schematic diagram of a forming machine 20 which can be used to make an embodiment of the nonwoven fabric 10 is shown. The forming machine 20 is shown as having a beam 21 for the formation or extrusion of the first ribbon-shaped spunbond fibers 13, a beam 23 for the formation or extrusion of the meltblown fibers 15, and a beam 25 for the formation or extrusion of the second ribbon-shaped spunbond fibers 17. The forming machine 20 has an endless forming belt 27 including a collection surface 22 wrapped around rollers 28 and 29 so the endless forming belt 27 is driven in the direction as shown by the arrows.

Beam 21 can produce the first ribbon-shaped spunbond fibers 13, for example, by use of a conventional spunbond extruder with one or more spinnerets which form ribbon-shaped spunbond fibers of polymer. The formation of the first ribbon-shaped spunbond fibers 13 and operation of such a spunbond forming beam is within the ability of those of ordinary skill in the art in view of the descriptions herein. Suitable polymers include any natural or synthetic polymer that are suitable for forming spunbond fibers such as polyolefin, polyester, polyamide, polyimide, polylactic acid, polyhydroxyalkanoate, polyvinyl alcohol, polyacrylates, viscose rayon, lyocell, regenerated cellulose, or any copolymers or combinations thereof. As an option, the polymer is a thermoplastic resin material. As used herein, the term "polyolefin" includes polypropylene, polyethylene and combinations thereof. As used herein, the term "polypropylene" includes all thermoplastic polymers where at least 50% by weight of the building blocks used are propylene monomers. Polypropylene polymers also include homopolymer polypropylenes in their isotactic, syndiotactic or atactic forms, polypropylene copolymers, polypropylene terpolymers, and other polymers comprising a combination of propylene monomers and other monomers. As an option, polypropylenes, such as isotactic homopolymer polypropylenes made with Ziegler-Natta, single site or metallocene catalyst system, may be used as the polymer. Polypropylene, for example, may be used which has a melt flow rate (MFR) of from about 8.5 g/10 min. to about 100 g/10 min. or preferably from 20 to 45 g/10 min., or other values. With respect to polypropylene, MFR refers to the results achieved by testing the polymer composition by the standard test method ASTM D1238 performed at a temperature of 230° C. and with a weight of 2.16 kg. As another option, the first ribbon-shaped spunbond fibers 13 as defined herein contain polypropylene in amounts of at least about 50% by weight, or at least about 55% by weight, or at least about 60% by weight, or at least about 65% by weight, or at least about 70% by weight or at least about 75% by weight, or at least about 80% by weight, or at least about 85% by weight or at least about 90% by weight, or at least about 95% by weight, or at least about 96% by weight, or at least about 97% by weight, or at least about 98% by weight, or at least about 99% by weight, or about 100% by weight, or at least about 50% to about 100% by weight, or at least about 60% to about 100% by weight, or at least about 70% to about 100% by weight, or at least about 80% to about 100% by weight, or at least about 90% to about 100% by weight of the first ribbon-shaped spunbond fibers 13. As another option, the first ribbon-shaped spunbond fibers 13 as defined herein may be formed as homogenous solid fibers, which are distinguished from multicomponent solid fibers (e.g., sheath-core fibers, bicomponent fibers, conjugate fibers), hollow fibers, or any combinations thereof.

In using beam 21 to produce the first ribbon-shaped spunbond fibers 13, the polymer is heated to become molten, and is extruded through the orifices in the spinneret. The extruded polymer fibers are rapidly cooled, and can be drawn by mechanical drafting rollers, fluid entrainment or other suitable means, to form the desired denier fibers. The fibers resulting from beam 21 are laid down onto the endless forming belt 27 to create the first ribbon-shaped spunbond layer 12. Beam 21 can include one or more spinnerets depending upon the speed of the process or the particular polymer being used. The dimensions d1 and d2 of the first ribbon-shaped spunbond fibers 13 can be controlled by factors including, but not limited to, spinning speed, mass throughput, temperature, spinneret geometry, blend composition, and/or drawing.

The spinnerets of beam 21 have orifices with a distinct cross-section that imparts a ribbon-shaped cross-sectional geometry to the spunbond fibers. As an option, the distinct cross-section of the spinneret orifices can generally correspond in cross-sectional geometry to that desired in the first ribbon-shaped spunbond fibers 13 formed using the spinnerets. For example, spinnerets with rectangular-shaped orifices can be used to form ribbon-shaped spunbond fibers having a rectangular cross-sectional geometry, a generally rectangular cross-sectional geometry with round edges or oval cross-sectional geometry, depending on processing conditions.

FIGS. 3A-3E depict several illustrative ribbon-shaped cross-sections that can be used. FIG. 3A shows a rectangular cross-sectional geometry 35, which has two longitudinal flat surfaces 351 and 352, and two squared ends 353 and 354 which are longitudinally parallel to each other; FIG. 3B shows a flat cross-sectional geometry 36; FIG. 3C shows a bi-lobal cross-sectional geometry 37; FIG. 3D shows an oval cross-sectional geometry 38; and FIG. 3E shows a ribbon-shaped cross-section 39 with at least two curvilinear surfaces. These examples of ribbon-shaped cross-sectional geometries as defined herein are for illustration and are not exhaustive. In FIGS. 3A-3E, dimension d1, as defined herein, is taken along a first axis and dimension d2, as defined herein, is taken along a second axis perpendicular to the first axis of the cross-section, wherein dimension d1 is greater than dimension d2. The aspect ratio of these cross-sectional geometries can be calculated as the ratio: (d1/d2). The result can be reported the ratio of dimension d1 to dimension d2 or, as a normalized value of (d1/d2):1. Further, the flat cross-sectional geometry such as illustrated in FIG. 3B, can refer to geometries, for example, that have at least two opposite flat sides and rounded sides. FIG. 3F shows a round or circular cross-sectional geometry 40. The dimensions d1 and d2 are equivalent in this illustration so the aspect ratio is 1:1. As indicated, round cross-sections have an aspect ratio less than 1.5:1 and are not ribbon-shaped as defined herein. As an option, the term "ribbon-shaped" includes cross-sections having an aspect ratio of greater than 1.5:1, or about 1.51:1 or greater, or about 1.55:1 or greater, or about 1.6:1 or greater, or about 1.75:1 or greater, or about 2.0:1 or greater, or about 2.25:1 or greater, or about 2.5:1 or greater, or about 2.75:1 or greater, or about 3:1 or greater, or about 3.25:1 or greater, or about 3.5:1 or greater, or about 3.75:1 or greater, or about 4:1 or greater, or about 4.5:1 or greater, or about 5:1 or greater, or about 5.5:1 or greater, or about 6:1 or greater, or about 6.5:1 or greater, or greater than or equal to at least about 1.55:1 and less than or equal to about 7:1 (i.e., from about 1.55 to about 7:1), or from about 1.6:1 to about 7:1, or from about 2.5:1 to about 5.5:1, or from about 2.75:1 to 5:1, or from about 3:1 to about 4.5:1, or from about 3.25:1 to about 4:1, or from about 3.5:1 to about 3.75:1, or from about 2.5:1 to about 5:1, or from about 2.5:1 to about 4.5:1, or from about 2.5 to about 4:1, or from about 2.5 to about 3.75, or from about 2.5:1 to about 6:1, or other values. Methods for preparing continuous filaments having different cross-sectional shapes or geometries which may be adapted for use in making ribbon-shaped filaments of the present invention are disclosed, for example, in U.S. Patent Application Publ. No. 2005/0227563 A1 (e.g., paragraphs [0054]-[0073]), which is incorporated herein by reference.

Beam 23 produces meltblown fibers 15A. As known to those skilled in the art, a typical method of producing meltblown fibers is by the meltblown process that includes extruding a molten material, such as a thermoplastic polymer, through a die 30 containing a plurality of orifices. The die 30 can contain from about 20 to about 100 orifices per inch of die width, or other values suitable for the meltblown layer formation. As the thermoplastic polymer, for example, exits the die 30, high pressure fluid, usually air, attenuates and spreads the polymer stream to form the meltblown fibers 15A. The meltblown process allows the use of various different polymers. Non-limiting examples include polypropylene (e.g., MFR of at least about 400 g/10 min. to no greater than about 2000 g/10 min.), blends including polypropylene (e.g. MFR of at least about 7.5 g/10 min. to no greater than about 2000 g/10 min.), polyethylene (e.g., melt flow index (MFI) of at least about 20 g/10 min. to no greater than about 250 g/10 min.), polyester (e.g., intrinsic viscosity of at least about 0.53 dL/g to no greater than about 0.64 dL/g), polyamide, polyurethane, polyphenylene sulphide, or other fiber materials, such as those indicated for use in forming the first ribbon-shaped spunbond fibers 13. With respect to polypropylene, MFR is a measure of polymer viscosity performed as per standard test method ASTM D1238 using a temperature of 230° C. and a weight of 2.16 kg. With respect to polyethylene, MFI is a measure of polymer viscosity performed as per standard test method ASTM D1238 using a temperature of 190° C. and a weight of 2.16 kg. Any of the foregoing polypropylene polymers may include vis-breaking additives (e.g. peroxide additives or non-peroxide containing additives, which are available, for example, under the tradename Irgatec® CR 76, from BASF Corporation of Ludwigshafen, Germany. The polymers and blends used during meltblown production ordinarily have a low viscosity or are designed and processed in a way to have their viscosity reduced during their extrusion one of the variables used to decrease their in situ viscosity is the use of a relatively high melt temperature (compared to other production processes). The melt temperature can be adjusted during production by means of electrical heating systems in the extrusion section or other means known in the industry. The meltblown fibers 15 resulting from beam 23 are laid down onto first ribbon-shaped spunbond layer 12, carried by the endless forming belt 27, to create the meltblown layer 14. The construction and operation of beam 23 for forming the meltblown fibers 15 and the meltblown layer 14 can be adapted based on conventional equipment in view of the present disclosures. For example, U.S. Pat. No. 3,849,241 (e.g., column 7, line 14 to col. 12, line 29), which is incorporated herein by reference, shows such conventional arrangements which may be adapted. Other methods for forming the meltblown layer 14 are contemplated for use with the present invention.

Beam 25 produces the second ribbon-shaped spunbond fibers 17, such as by use of a conventional spunbond extruder, and can have a substantially similar design as beam 21. Beam 25 can involve different processing parameters than those of beam 21 as long as ribbon-shaped spunbond fibers are formed. For example, the polymer used in beam 25 can be similar or different from the polymers used in beam 21. The temperature and attenuation for beam 25 can also differ from beam 21. The spinnerets of beam 25 have orifices with a distinct cross-section that impart a ribbon-shaped cross-sectional geometry to the resulting ribbon-shaped spunbond fibers 17. The spinnerets of beam 25 yield ribbon-shaped spunbond fibers 17 with a cross-sectional geometry and/or aspect ratio which is the same or different from the ribbon-shaped cross-sectional geometry and aspect ratio of first ribbon-shaped spunbond fibers 13. The second ribbon-shaped spunbond fibers 17 of the second ribbon-shaped spunbond layer 16 can comprise, for example, ribbon-shaped fibers having a cross-sectional geometry such as illustrated in FIGS. 3A-3E. The second ribbon-shaped spunbond fibers 17 resulting from beam 25 are laid down onto the meltblown layer 14, which is on the first ribbon-shaped spunbond layer 12 that is carried on the endless forming belt 27, to create the second ribbon-shaped spunbond layer 16.

In another option, the forming machine 20 can include a beam 31 located along endless forming belt 27 between beam 23 and beam 25. Beam 31 can be configured to produce a second meltblown layer on meltblown layer 14 or a second meltblown sub-layer 14B, before the formation of the second ribbon-shaped spunbond layer 16 thereon at beam 25. This arrangement, if used, can form two consecutive meltblown layers, such as meltblown sub-layers 14A and 14B as illustrated in FIG. 1. Beam 31, if included, can have similar or dissimilar settings, and operabilities as beam 23 and may use the same or different polymers as used in beam 23. Additional beams can be added to form additional meltblown layers or sub-layers or additional ribbon-shaped spunbond layers, consistent with the nonwoven fabric 10 described herein.

Figure 4:
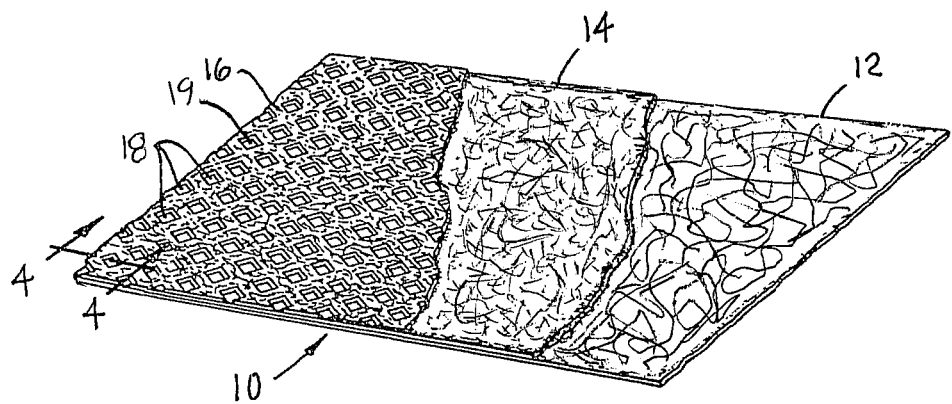
FIG. 4 is a fragmentary perspective view, with sections broken away, of a nonwoven fabric in accordance with an embodiment of the present invention.
Figure 5:
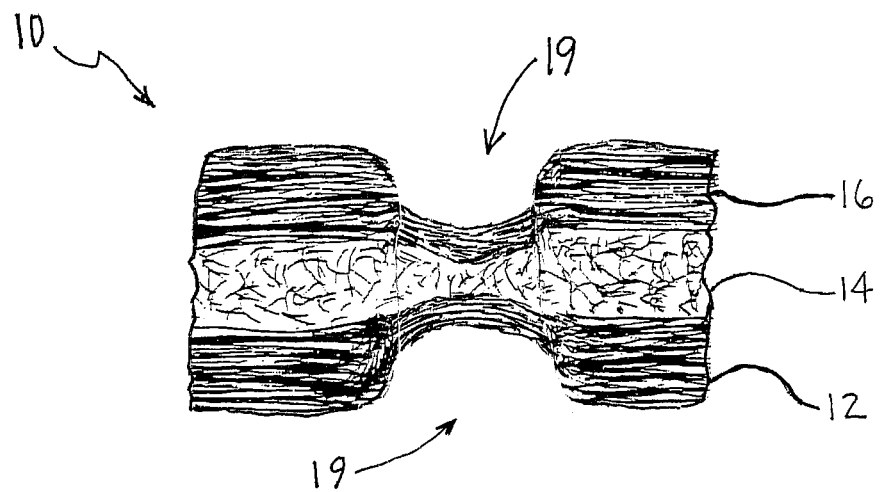
FIG. 5 is a sectional view along line 4-4 of FIG. 4.

The resulting nonwoven fabric 10 can be fed through bonding rolls 32 and 33 to consolidate the nonwoven fabric 10. As an option, the nonwoven fabric 10 can be embossed with a pattern from at least one side. FIG. 5 illustrates the nonwoven fabric 10 after being embossed with a pattern on both sides. The surfaces of one or both of the bonding rolls 32 and 33 can be provided, for example, with a raised pattern such as spots or grids. As an option, one bonding roll 32 or 33 can include a raised pattern while the other bonding roll (32 or 33) can be smooth. The bonding rolls 32 and 33 can be heated to the softening temperature of the polymer used to form the layers of the nonwoven fabric 10. As the nonwoven fabric 10 passes between the heated bonding rolls 32 and 33, the material is embossed by the bonding rolls in accordance with the pattern on the rolls to create a pattern of discrete bonded areas. The bonded areas are bonded from layer to layer with respect to the particular filaments and/or fibers within each layer. FIG. 4 shows an illustration of a nonwoven fabric 10 with a pattern 18 of such discrete thermally bonded areas 19. The total area of the bond pattern 18 relative to the overall surface area of the fabric can be, for example, from about 10% to about 25%, or from about 13% to about 25%, or from about 15% to about 25%, or from about 18% to about 25%, or from about 15% to about 23%, or from about 16% to about 23%, or other values. The embossed pattern shape of the discrete thermally bonded areas 19 can be, for example, diamond, oval, or other discrete shapes. FIG. 5 shows a view of one of the indicated discrete thermally bonded areas 19 through the cross-section of the nonwoven fabric 10. The bonding rolls 32 and 33 can have embossing protuberances that are synchronized to compress the nonwoven fabric 10 from opposite sides at corresponding locations (as shown) or different locations on each side of the nonwoven fabric 10. The depth of compression produced from the opposite sides of the nonwoven fabric 10 by the embossing protuberances of the respective bonding rolls 32 and 33 can have different (as shown) or the same. Such bonding, which is sometimes referred to as discrete area or spot bonding, is well-known in the art and can be carried out as described by means of heated rolls or by means of ultrasonic heating of the nonwoven fabric 10 to produce fibers and layers having discrete thermally bonded fibers. Thermal pattern bonding such as described, for example, in Brock et al., U.S. Pat. No. 4,041,203 (e.g., col. 6, lines 10-28), which is incorporated herein by reference, can be adapted to provide the indicated discrete or spot bonding. In FIG. 5, the fibers of the meltblown layer 14 in the fabric laminate 10 can fuse within the bond areas while the ribbon-shaped fibers 13 and 17 of the first and second ribbon-shaped spunbond layers 12 and 16, respectively, retain some of their integrity, in order to achieve good strength characteristics. For heavier basis weight nonwoven fabrics, for example, sonic bonding methods and devices which are generally known can be adapted for use. Other nonwoven fabric bonding methods known in the art also can be adapted and used. Furthermore, it is envisioned that the nonwoven fabric may be created from discrete spunbond or meltblown layers that are formed, rolled, and later joined or laminated by methods well known in the art (including stacking the discrete layers without bonding) rather than the discrete spunbond and/or meltblown layers being laid by a single forming machine as presented above.

As an option, the forming machine 20 can be provided as a modular structure of the spunbond and meltblown components. A common operating console for all the spinning stations can be provided with the common high speed belt for all spinning stations. A high speed winding system (not shown) can be provided as an option with a downstream slitter and rewinder downstream of the embossing station.

In further reference to FIG. 2, distance 34 is the distance from the die of beam 23 to the collection surface 22 of the endless forming belt 27. As indicated, nonwoven fabrics made from the first and second ribbon-shaped spunbond layers 12 and 16 as outer layers with an interposed meltblown layer 14 as described can have a significantly lower Flow Ratio than equivalent examples made from round-shaped spunbond fibers or round-shaped spunbond layers. It also has been observed that the difference in the Flow Ratio can be more pronounced for examples where the meltblown fibers 15A were applied to the ribbon-shaped spunbond layer 12 and meltblown fibers 15B were applied to the underlying meltblown fibers 15A and ribbon-shaped spunbond layer 12 from a smaller distance from die to collector (or "DCD") from beam 23, beam 31 or other beams. For example, in examples with an S/M/S or S/M/M/S layered construction, having a total basis weight of at least about 13 to no greater than about 14 gsm, which includes about meltblown fibers in an amount of at least about 1.3 gsm to no greater than about 1.5 gsm, the DCD can have a significant impact on the above mentioned Flow Ratio. That relationship between the change in ratio and the DCD indicates that the synergy between the meltblown fibers 15A and 15B and ribbon-shaped spunbond fibers 13, 17 can be even more pronounced when the meltblown fibers 15A and 15B are projected with more force due to having to travel a shorter distance toward the underlying ribbon-shaped spunbond layer 12. The meltblown fibers 15A and 15B may have the ability to form a more two-dimensional and rigid web when applied to an underlying ribbon-shaped spunbond layer 12 rather than an underlying round-shaped spunbond layer. This is supported by gathered pore size data, such as disclosed in the examples section herein. The data indicates that the synergy exists specifically for examples where there are fewer large pores or, in other words, there is a lower fraction of large pores in the pore distribution.

Uses of Nonwoven Fabrics

The nonwoven fabrics of the present invention can be used as a barrier fabric or other component within a multitude of personal hygiene products. These personal hygiene products can include, for example, diapers. Diapers can include various diaper components, such as described in U.S. Patent Application Publ. No. 2005/0215155 A1 (e.g., paragraphs [0047]-[0069]), which is incorporated herein by reference. The nonwoven fabrics of the present invention can be used in place of the nonwoven fabrics described in the diapers or diaper components of the above incorporated published patent application, such as, for example, the nonwoven fabrics that form the topsheet, backsheet or leg cuffs. The nonwoven fabrics of the present invention can also be used as a core wrap in diapers or diaper components. Furthermore, the nonwoven fabric of the present invention can be used in place of other substrates wherein the breathability and/or barrier protection characteristics of the nonwoven fabric of the present invention are desired. As an option, the nonwoven fabric of the present invention can be used as a diaper or adult incontinence product leg cuff. As another option, the nonwoven fabrics of the present invention can be used as a barrier layer within absorbent personal hygiene products. The nonwoven fabric can be used as a barrier layer, such as a backsheet, topsheet, anal cuff, outer cover, and barrier cover. Furthermore, the nonwoven fabric of the present invention can be used in disposable personal hygiene products including, but not limited to, drapes (e.g., surgical and other medical drapes), gowns (e.g., surgical and other medical gowns), sterilization wraps, and foot covers.

The present invention will be further clarified by the following examples, which are intended to be only exemplary of the present invention.

EXAMPLES

Test Methods

Basis Weight

Basis weight of the following examples was measured in a way that is consistent with ASTM D756 and EDANA ERT-40,3-90 test method. The results were provided in units of mass per unit area in g/m² (gsm) and were obtained by weighing a minimum of ten 10 cm by 10 cm samples of each of the Comparative Examples and Examples below.

Air Permeability

Air permeability data were produced using a TexTest FX3300 Air Permeability Tester manufactured by TexTest AG of Zurich, Switzerland. The TexTest FX3300 Air Permeability Tester was used accordingly with the manufacturer's instructions using a 38 mm orifice and a pressure drop of 125 Pa as per test method ASTM D-737 test method. Readings were made on single ply or layer samples and double ply or layer samples of the Comparative Examples and Examples below and, the results were recorded in the units of m³/m²/min.

Low Surface Tension Strike Through (LSTST)

The Low Surface Tension Strike Through method utilized was based on EDANA test method WSP70.3 (05) with a few modifications. A first modification to EDANA test method WSP70.3 (05) was that a low surface tension fluid, described below in more detail, was utilized instead of simulated urine solution of a 9 g/l solution of sodium chloride in distilled water having a surface tension of 70±2 mN/m. A second modification to EDANA test method WSP70.3 (05) was that for the samples of the Comparative Examples and Examples where the strike through time was less than 8 seconds when performed on a single ply, the measurement was performed on two plies or layers of the sample. The second modification was needed to increase the time needed to absorb the 5 ml of fluid and subsequently reduce the variability of the Low Surface Tension Strike Through method. A third modification to EDANA test method WSP70.3 (05) was that the Ahlstrom Filtration filter paper code #989 (available from Empirical Manufacturing, Inc., 7616 Reinhold Drive, Cincinnati, Ohio 45237, USA) having dimensions of 4 inches by 4 inches was used as a blotter or absorbent paper positioned under the sample, instead of the suggested blotter paper ERT FF2, which is available from Hollingsworth & Vose Co. or East Walpole, Mass. The five blotter papers used per test were stacked with the rougher surface facing the incoming fluid.

The low surface tension liquid utilized in the EDANA test method WSP70.3 (05) was prepared as follows: in a clear clean flask, 500 ml distilled water was provided and 2.100 grams of an nonionic surfactant, which is available under the trademark Triton® X-100 from Sigma-Aldrich of St. Louis, Mo., was added to the flask containing the 500 ml distilled water. Thereafter, distilled water in an amount of 5,000 ml was added to the same flask. The distilled water and nonionic surfactant solution was mixed for a minimum of 30 minutes. The surface tension of the solution was measured, to ensure it was between 31 mN/m and 32.5 mN/m, and preferably about 32 mN/m, to qualify as a low surface tension liquid. The surface tension of the solution was determined by method D1331-56 ("Standard test method for surface and interfacial tension solution of surface active agents") using a Krüss K11 MK1 tensiometer.

For the purposes herein, the LSTST-Time is defined as the strike through time in seconds measured by this method. The LSTST-Flow is defined as follow:

$$\text{LSTST-Flow}=5 \text{ (ml)/LSTST-Time (seconds)}.$$

The units for LSTST-Flow are ml/sec. It is an expression of the average flow rate of the low surface tension fluid through the sample during the duration of the test.

Flow Ratio

Flow Ratio is defined as the ratio of LSTST-Flow to air permeability. This comparison was performed by measuring the LSTST-Flow and air permeability of each of the Comparative Examples and Examples below. The measurements were taken of each example while ensuring the samples used for the measurements had the same number of plies for both the LSTST-Flow and air permeability measurements.

$$\text{Flow Ratio}=FR=\text{LSTST-Flow}/Air \text{ permeability}.$$

For the Flow Ratio, the units for LSTST-Flow are ml/sec, and the units for air permeability are m³/m²/min.

Fiber Dimension and Aspect Ratio

Fiber Dimension Test Method 1 is utilized to measure the dimensions d1 and d2 of round fibers in the samples of the Comparative Examples and Examples below. Fiber Dimension Test Method 1 assumes that round fiber have dimensions d1 and d2 that are equal. As will be discussed below, Fiber Dimension Test Method 1 was also used to measure the dimension d1 or the fiber width of the ribbon-shaped spunbond fibers of Examples 7-12 and 15-16 for comparison purposes. Fiber Dimension Test Method 1 was measured using a microscope positioned to view the fabric at 90° from the fabric surface. For spunbond fibers specifically, an optical microscope was used to magnify the side-view of the selected fibers in order to measure dimension d1 of the fibers. The optical microscope was first calibrated using an acceptable standard (e.g. Optical grid calibration slide 03A00429 S16 Stage Mic 1 MM/0.01 DIV available from Pyser-SGI Limited of Kent, UK or SEM Target grid SEM NIST SRM 4846 #59-27F). For each layer, Fiber Dimension Test Method 1 utilized the common practice of selecting fibers at random to measure the dimension d1 of fibers. In each layer of the sample taken from the Comparative Examples and Examples, fibers were selected by drawing a line between two points of the sample being examined and selecting a minimum of 10 fibers for measurement. Such an approach minimizes multiple measurements of the same fiber. After magnification, the dimensions d1 were measured of the selected fibers along the same axis as the line drawn between two points of the sample. The average of the measured dimensions d1 of the fibers was calculated based on the count of the fibers. As stated above, because the dimensions d1 and d2 are assumed equal for round-shaped fibers, the aspect ratio for such fibers was about 1:1.

Accordingly, the dimension d1 of the meltblown fibers were also measured as per Fiber Dimension Test Method 1 with the exception that a scanning electron microscope was used to achieve a greater degree of magnification. It is generally accepted that meltblown fibers have a round cross-sectional geometry, therefore it was assumed that meltblown fiber cross-sections will have dimensions d1 and d2 that are equal, producing an aspect ratio of 1:1.

For ribbon-shaped spunbond fibers, Fiber Dimension Test Method 1 is not a suitable method to measure the dimensions d1 and d2 needed for the computation of the aspect ratio. This is because Fiber Dimension Test Method 1 does not provide information about dimension d2 and, also because the average fiber dimension of the ribbon-shaped spunbond fibers that was observed and measured by Fiber Dimension Test Method 1 is typically less than the actual average of dimension d1, as defined herein. The discrepancy between the average fiber dimension observed and measured by Fiber Dimension Test Method 1 and actual average of dimension d1 is because not all of the ribbon-shaped spunbond fibers observed are lying flat in the X-Y plane of the ribbon-shaped spunbond layer, with their respective longest cross-sectional dimension all positioned along the X-Y plane or all positioned along the Z plane that is perpendicular to the X-Y plane. Therefore, Fiber Dimension Test Method 2 was used to measure the dimensions d1 and d2 and determine the aspect ratios of ribbon-shaped spunbond fibers, consistent with the definition of aspect ratio. For Fiber Dimension Test Method 2, a sample was taken from the Examples below and the ribbon-shaped spunbond fibers in the sample were cut perpendicular to their length. After cutting the ribbon-shaped spunbond fibers, their cross-sections were observed using an optical microscope that had been calibrated in a similar manner as in Fiber Dimension Test Method 1. The dimensions d1 and d2 were measured for a minimum of 8 representative ribbon-shaped spunbond fibers selected from the sample and average of the measurements of dimensions d1 and d2, respectively, was calculated based on number of fibers. The Fiber Dimension Test Method 2 is also a suitable method to measure dimension d1 and d2 and compute the aspect ratio for round-shaped fibers.

Pore Size Distribution

The pore size distributions of the Comparative Examples and Examples were measured using a capillary flow porometer. The instrument used was a PMI Capillary Flow Porometer model CFP-1200-ACL-E-X-DR-2S, available from Porous Materials, Inc. of Ithaca, N.Y. The instrument utilized a wetting fluid having a surface tension of 15.9 mN/m, available under the trademark Galwick® from Porous Materials, Inc.

The method used to measure the cumulative flow and pore size distribution was provided by the equipment manufacturer and is identified as "Capillary Flow Porometry Test" using the "Wet up/Dry up" mode. A wrinkle free, clean circular sample is obtained from the Comparative Examples and Examples having a diameter of about 1.0 cm. The sample was saturated with the wetting fluid and then mounted into the cell of the PMI Capillary Flow Porometer, as per the manufacturer's instruction. When the mounting was complete, the apparatus was run by the apparatus software in the "Wet up/Dry up" mode to first record a flow vs. pressure curve for the sample saturated with the wetting fluid. When the flow v. pressure curve is recorded for the saturated sample, and the fluid has been expulsed from the pores, a flow vs. pressure curve was measured a second time on the same sample mounted in the instrument. The data generated includes the mean flow pore or "MFP," where the pore size was calculated from the pressure where the half-dry curve intersects with the wet curve. The mean flow pore diameter was such that 50% of the flow is through pores larger than the mean flow pore. The measurement of pore size at 10% cumulative filter flow and the pore size at 25% cumulative filter flow were used as a way to characterize the presence of large pores.

Examples and Results

Comparative Examples and Examples 1 to 16 included nonwoven fabrics that were prepared on a line fitted with four production beams (e.g., first, second, third and fourth production beams, respectively) designed by Reifenhäuser Reicofil GmbH & Co. KG of Troisdorf, Germany. The first production beam formed spunbond fibers that were deposited on a moving belt to form a first spunbond layer. The second production beam formed meltblown fibers that were laid on top of the first spunbond layer to form a first meltblown sub-layer. The third production beam formed meltblown fibers that were laid on top of the first meltblown sub-layer to form a second meltblown sub-layer. The distance from die to collector (DCD) for the second and third meltblown production beams were adjusted between the various samples as indicated herein. The fourth production beam formed spunbond fibers that were laid on top of the second meltblown sub-layer to form a second spunbond layer. The resulting stack of layers was bonded together using a calendar fitted with a smooth roll and an embossed roll. The embossed roll was provided with two different patterns that were positioned side by side to provide Comparative Examples and Examples with specific bonding patterns as indicated below. One of the patterns is identified in the data below as pattern A and includes an angled oval pattern embossed with pattern available under the commercial code U2888 from A+E Ungricht GMBH & Co. KG of Monchengladbach, Germany. Pattern A is described as being formed from a plurality of raised pins with a surface contact area or "land" area covering at least about 16% and no greater than about 20% of the total area of the embossed portion of the roll containing pattern A and having a pin density of about 50 pins/cm$^2$. The second pattern on the embossed roll is identified in the data below as pattern B, which is available under the commercial code U5444 through equipment manufacturer Reifenhäuser Reicofil GmbH & Co. KG of Troisdorf, Germany and is produced by A+E Ungricht GMBH & Co. Kg of Monchengladbach, Germany. Pattern B included an angled oval pattern having a plurality of raised pins with a surface contact area or "land" area covering more than 18% and no greater than 25% of the total area of the embossed portion of the roll containing pattern B and having a pin density of about 62.4 pins/cm$^2$. The resulting fabrics obtained from pattern A and pattern B included an S/M/M/S layered construction.

For the production of the Comparative Examples and Examples 1 to 16, the first and fourth beams were fitted with the spinnerets including either capillaries with a round cross-sectional geometry to produce round-shaped spunbond fibers or capillaries with ribbon-shaped cross-sectional geometry that produced the ribbon-shaped spunbond fibers. The capillaries with the round cross-sectional geometry had dimension d1 and d2 of 0.6 mm and an aspect ratio of about 1.0:1.0. The capillaries with the ribbon-shaped cross-sectional geometry had a rectangular shape with rounded corners, a dimension d1 of about 1.5 mm and dimension d2 of about 0.24 mm producing an aspect ratio of about 6.25:1. The throughput was maintained on average at about 0.4 gram per capillary or hole and per minutes (ghm)

In each of Comparative Examples and Examples 1 to 16, the spunbond fibers formed by the first production beam and the fourth production beam were extruded from a polypropylene resin having a melt flow rate ("MFR") of 36 g/10 min., available under the tradename PP3155 from Exxon-Mobil Chemicals, Inc. of Houston, Tex. For Comparative Examples and Examples 1 to 16, the molten polymer temperature was recorded at about 242° C. for first production beam and about 245° C. for fourth production beam. In each of Comparative Examples and Examples 1 to 16, the meltblown fibers formed by the second and third production beams were extruded from a polypropylene resin having a MFR of 1500 g/10 min. In each of Comparative Examples and Examples 1 to 16, the meltblown layer, which included meltblown fibers formed by the second and third production beams, had basis weight of about 10% of the total basis weight.

Examples 7-12 and 15-16 included two spunbond layers formed from ribbon-shaped spunbond fibers. Accordingly, select representative samples were taken from Examples 7-12 and the dimensions d1 and d2 for the ribbon-shaped spunbond fibers in each representative sample were measured according to Fiber Dimension Test Method 2. Based on this method, it was found that Examples 7-12 had an average dimension d1 of about 27.0 microns and an average cross-sectional dimension d2 of about 8.3 microns. From these average dimensions d1 and d2 an aspect ratio of about 3.25:1 was calculated for the ribbon-shaped spunbond fibers of Examples 7-12. For each of Examples 15 and 16, the ribbon-shaped spunbond fibers were formed using the same process conditions. Accordingly, select representative samples were taken from Examples 15 and 16 and the dimensions d1 and d2 for the ribbon-shaped spunbond fibers in each sample were measured according to Fiber Dimension Test Method 2. The average dimension d1 was 26.1 microns and the average dimension d2 was 8.4 microns. From the average d1 and d2 an aspect ratio of about 3.15:1 was calculated for the ribbon-shaped spunbond fibers of Examples 15 and 16 Comparative Examples 1-6 and 13-14 included two spunbond layers formed from round-shaped spunbond fibers. For those round-shaped spunbond fibers, the averages of dimensions d1 were measured according to Fiber Dimension Test Method 1.

Comparative Example 1

Comparative Example 1 was produced on the above described production beams wherein the first and fourth production beans had spinnerets with capillaries having a round cross-sectional geometry, as indicated above. The resulting S/M/M/S layers were then bonded using the embossed roller with pattern A. The resulting fabric included a first round-shaped spunbond layer, two meltblown layers and a second round-shaped spunbond layer, wherein the spunbond layers have fibers with a round cross-sectional geometry and an aspect ratio of less than 1.5. The meltblown layers of Comparative Example 1 were formed from the second and third production beams, which were positioned such that the DCD was 110 mm. The process conditions for forming Comparative Example 1 were selected to approximate the commercial production of S/M/M/S suitable for use as barrier leg cuff fabric. The average basis weight for each layer was calculated based on the measured total basis weight for the fabric and the throughput recorded for each production beam The total basis weight measurement, the basis weight calculations for each layer and average fiber dimension measurements, according to Fiber Dimension Test Method 1, for Comparative Example 1 are reproduced below in Table 1:

TABLE 1

Basis Weight Measurement and Calculations Per Layer and Average Fiber Dimension Measurements for Comparative Examples 1 & 2.

| Basis Weight | |
|---|---|
| Round-shaped spunbond fibers from $1^{st}$ production beam | 5.94 gsm |
| Meltblown fibers from $2^{nd}$ production beam | 0.66 gsm |
| Meltblown fibers from $3^{rd}$ production beam | 0.66 gsm |
| Round-shaped spunbond fibers from $4^{th}$ production beam | 5.94 gsm |
| Total basis weight measured | 13.2 gsm |
| Average Fiber Dimension Measurements According To Fiber Dimension Test Method 1 | |
| Round-shaped spunbond fibers from $1^{st}$ production beam | 14.0 μm |
| Meltblown fibers from $2^{nd}$ production beam | 1.1 μm |
| Meltblown fibers from $3^{rd}$ production beam | 1.2 μm |
| Round-shaped spunbond fibers from $4^{th}$ production beam | 14.5 μm |

Comparative Example 2

Comparative Example 2 was produced in the same manner as Comparative Example 1 with the exception that the bonding pattern B was used. Comparative Example 2 had the same total basis weight measurement, basis weight calculations per layer and average fiber dimension measurements as Comparative Example 1, which are provided above in Table 1.

Comparative Example 3

Comparative Example 3 was produced in the same manner as Comparative Example 1 with the exception that the DCD was 150 mm. The total basis weight measurement, basis weight calculations per layer and average fiber dimension measurements, according to Fiber Dimension Test Method 1, for Comparative Example 3 are reproduced below in Table 2:

TABLE 2

Basis Weight Measurement and Calculations Per Layer and Average Fiber Dimension Measurements for Comparative Examples 3 & 4

| Basis Weight | |
|---|---|
| Round-shaped spunbond fibers from $1^{st}$ production beam | 5.9 gsm |
| Meltblown fibers from $2^{nd}$ production beam | 0.66 gsm |
| Meltblown fibers from $3^{rd}$ production beam | 0.66 gsm |
| Round-shaped spunbond fibers from $4^{th}$ production beam | 5.9 gsm |
| Total basis weight measured | 13.1 gsm |
| Average Fiber Dimension Measurements According To Fiber Dimension Test Method 1 | |
| Round-shaped spunbond fibers from $1^{st}$ production beam | 14.5 μm |
| Meltblown fibers from $2^{nd}$ production beam | 1.1 μm |
| Meltblown fibers from $3^{rd}$ production beam | 1.2 μm |
| Round-shaped spunbond fibers from $4^{th}$ production beam | 14.0 μm |

Comparative Example 4

Comparative Example 4 was produced in the same manner as Comparative Example 2 with the exception that the DCD was 150 mm. Comparative Example 4 had the same total basis weight measurement, basis weight calculations per layer and average fiber dimension measurements as Comparative Example 3, which are provided above in Table 2.

Comparative Example 5

Comparative Example 5 was produced in the same manner as Comparative Example 1 with the exception that the DCD was 190 mm. The total basis weight measurement, basis weight calculations per layer and average fiber dimension measurements, according to Fiber Dimension Test Method 1, for Comparative Example 5 are reproduced below in Table 3:

TABLE 3

Basis Weight Measurement and Calculations Per Layer and Average Fiber Dimension Measurements for Comparative Examples 5 & 6

| Basis Weight | |
|---|---|
| Round-shaped spunbond fibers from $1^{st}$ production beam | 5.85 gsm |
| Meltblown fibers from $2^{nd}$ production beam | 0.65 gsm |
| Meltblown fibers from $3^{rd}$ production beam | 0.65 gsm |
| Round-shaped spunbond fibers from $4^{th}$ production beam | 5.85 gsm |
| Total basis weight measured | 13.0 gsm |
| Average Fiber Dimension Measurements According To Fiber Dimension Test Method 1 | |
| Round-shaped spunbond fibers from $1^{st}$ production beam | 13.5 μm |
| Meltblown fibers from $2^{nd}$ production beam | 1.2 μm |
| Meltblown fibers from $3^{rd}$ production beam | 1.2 μm |
| Round-shaped spunbond fibers from $4^{th}$ production beam | 14.5 μm |

Comparative Example 6

Comparative Example 6 was produced in the same manner as Comparative Example 2 with the exception that the DCD was 190 mm. Comparative Example 6 had the same total basis weight measurement, basis weight calculations per layer and average fiber dimension measurements as Comparative Example 5, which are provided above in Table 3.

Example 7

Example 7 was produced using the same production beams as Comparative Example 1, except the first and fourth production beams included spinnerets included capillaries having a ribbon-shaped geometry, as indicated above. As a result, Example 7 included two spunbond layers of ribbon-shaped spunbond fibers instead of round-shaped spunbond fibers. While the polymer throughputs for the first and fourth production beams were kept about the same as those used for Comparative Example 1, some of the other fiber spinning conditions (e.g. volume of cooling air) had to be adjusted to achieve process stability. The total basis weight measurement, basis weight calculations per layer and average fiber dimension measurements, according to Fiber Dimension Test Method 1, for Example 7 are reproduced below in Table 4:

TABLE 4

Basis Weight Measurement and Calculations Per Layer and Average Fiber Dimension Measurements for Examples 7 & 8

| Basis Weight | |
|---|---|
| Round-shaped spunbond fibers from $1^{st}$ production beam | 6.075 gsm |
| Meltblown fibers from $2^{nd}$ production beam | 0.675 gsm |
| Meltblown fibers from $3^{rd}$ production beam | 0.675 gsm |
| Round-shaped spunbond fibers from $4^{th}$ production beam | 6.075 gsm |
| Total basis weight measured | 13.5 gsm |
| Average Fiber Dimension Measurements According To Fiber Dimension Test Method 1 | |
| Ribbon-shaped spunbond fibers from $1^{st}$ production beam | 19.5 μm |
| Meltblown fibers from $2^{nd}$ production beam | 1.1 μm |
| Meltblown fibers from $3^{rd}$ production beam | 1.2 μm |
| Ribbon-shaped spunbond fibers from $4^{th}$ production beam | 21.0 μm |

Example 8

Example 8 was produced in the same manner as Example 7 with the exception that the bonding pattern B was used. The total basis weight calculation for Example 8 was the same total basis weight as Example 7. In addition, the individual S/M/M/S layers of Example 8 had the same basis weight calculations as Example 7, shown in Table 4. The average fiber dimension of the fibers made from beams 1, 2, 3, and 4 in Example 8 were measured using Fiber Dimension Test Method 1 and were the same as Example 7, shown above in Table 4.

Example 9

Example 9 was produced in the same manner as Example 7 with the exception that the DCD was set at 150 mm. The total basis weight measurement, basis weight calculations per layer and average fiber dimension measurements, according to Fiber Dimension Test Method 1, for Example 9 are reproduced below in Table 5:

TABLE 5

Basis Weight Measurement and Calculations per Layer and Average Fiber Dimension Measurements for Examples 9 & 10

| Basis Weight | |
|---|---|
| Round-shaped spunbond fibers from $1^{st}$ production beam | 6.21 gsm |
| Meltblown fibers from $2^{nd}$ production beam | 0.69 gsm |
| Meltblown fibers from $3^{rd}$ production beam | 0.69 gsm |
| Round-shaped spunbond fibers from $4^{th}$ production beam | 6.21 gsm |
| Total basis weight measured | 13.8 gsm |
| Average Fiber Dimension Measurements According to Fiber Dimension Test Method 1 | |
| Ribbon-shaped spunbond fibers from $1^{st}$ production beam | 20.5 μm |
| Meltblown fibers from $2^{nd}$ production beam | 1.1 μm |
| Meltblown fibers from $3^{rd}$ production beam | 1.2 μm |
| Ribbon-shaped spunbond fibers from $4^{th}$ production beam | 22.5 μm |

Example 10

Example 10 was produced in the same manner as Example 8 with the exception that the DCD was set at 150 mm. The total basis weight calculation for Example 10 were the same total basis weight as Example 9. In addition, the individual S/M/M/S layers of Example 10 had the same basis weight calculations as Example 9, shown in Table 5. The average fiber dimension of the fibers made from beams 1, 2, 3, and 4 in Example 10 were measured using Fiber Dimension Test Method 1 and were the same as Example 9, shown above in Table 5.

Example 11

Example 11 was produced in the same manner as Example 7 with the exception that the DCD was set at 190 mm. The total basis weight measurement, basis weight calculations per layer and average fiber dimension measurements, according to Fiber Dimension Test Method 1, for Example 11 are reproduced below in Table 6:

TABLE 6

Basis Weight Measurement and Calculations per Layer and Average Fiber Dimension Measurements for Examples 11 & 12

| Basis Weight | |
|---|---|
| Round-shaped spunbond fibers from $1^{st}$ production beam | 5.805 gsm |
| Meltblown fibers from $2^{nd}$ production beam | 0.645 gsm |
| Meltblown fibers from $3^{rd}$ production beam | 0.645 gsm |
| Round-shaped spunbond fibers from $4^{th}$ production beam | 5.805 gsm |
| Total basis weight measured | 12.9 gsm |
| Average Fiber Dimension Measurements According To Fiber Dimension Test Method 1 | |
| Ribbon-shaped spunbond fibers from $1^{st}$ production beam | 19.5 μm |
| Meltblown fibers from $2^{nd}$ production beam | 1.1 μm |
| Meltblown fibers from $3^{rd}$ production beam | 1.2 μm |
| Ribbon-shaped spunbond fibers from $4^{th}$ production beam | 21.0 μm |

Example 12

Example 12 was produced in the same manner as Example 8 with the exception that the DCD was set at 190 mm. The total basis weight calculation for Example 12 was the same total basis weight as Example 11. In addition, the individual S/M/M/S layers of Example 12 had the same basis weight calculations as Example 11, shown in Table 6. The average fiber dimension of the fibers made from beams 1, 2, 3, and 4 in Example 12 were measured using Fiber Dimension Test Method 1 and were the same as Example 11, shown above in Table 6.

Comparative Example 13

Comparative Example 13 was made using the production beams described above with reference to Comparative Examples 1-6. The resulting fabric included a first round-shaped spunbond layer, two meltblown layers and a second round-shaped spunbond layer having fibers with a round cross-sectional geometry and an aspect ratio of less than 1.5:1. However process conditions including polymer throughputs were modified to produce an S/M/M/S fabric that is more typical of those used for medical protective barrier applications, such as gown and drapes. The basis weight measurement, basis weight calculations per layer and average fiber dimension measurements, according to Fiber Dimension Test Method 1, for Comparative Example 13 are reproduced below in Table 7:

TABLE 7

Basis Weight Measurement and Calculations per Layer and Average Fiber Dimension Measurements for Comparative Examples 13 & 14

| Basis Weight | |
|---|---|
| Round-shaped spunbond fibers from $1^{st}$ production beam | 18.1 gsm |
| Meltblown fibers from $2^{nd}$ production beam | 4.4 gsm |
| Meltblown fibers from $3^{rd}$ production beam | 4.4 gsm |
| Round-shaped spunbond fibers from $4^{th}$ production beam | 18.1 gsm |
| Total basis weight measured | 45.5 gsm |
| Average Fiber Dimension Measurements According To Fiber Dimension Test Method 1 | |
| Round-shaped spunbond fibers from $1^{st}$ production beam | 14.0 μm |
| Meltblown fibers from $2^{nd}$ production beam | 1.5 μm |
| Meltblown fibers from $3^{rd}$ production beam | 1.4 μm |
| Round-shaped spunbond fibers from $4^{th}$ production beam | 14.5 μm |

Comparative Example 14

Comparative Example 14 was produced in the same manner as Comparative Example 13, except that bonding pattern B was utilized. Comparative Example 14 had the same total basis weight, basis weight calculations per layer and average fiber dimension measurements as Comparative Example 13, which are provided above in Table 7.

Example 15

Example 15 was made in the same manner and using the same production beams as Comparative Example 13, except that the first and fourth production beams included spinnerets having capillaries with a ribbon-shaped geometry, as indicated. Example 15 included two ribbon-shaped spunbond layers formed from ribbons-shaped spunbond fibers. The total basis weight for Example 15 was the same total basis weight calculation as Comparative Example 13. In addition, the individual S/M/M/S layers of Example 15 had the same basis weight calculations as Comparative Example 13, shown in Table 7. The average fiber dimension measurements, according to Fiber Dimension Test Method 1 for Example 15 are reproduced below in Table 8:

TABLE 8

Basis Weight Measurement and Calculations per Layer Average Fiber Dimension Measurements for Examples 15 & 16

| Basis Weight | |
|---|---|
| Ribbon-shaped spunbond fibers from $1^{st}$ production beam | 18.25 gsm |
| Meltblown fibers from $2^{nd}$ production beam | 4.5 gsm |

TABLE 8-continued

Basis Weight Measurement and Calculations per Layer Average Fiber Dimension Measurements for Examples 15 & 16

| | |
|---|---|
| Meltblown fibers from 3$^{rd}$ production beam | 4.5 gsm |
| Ribbon-shaped spunbond fibers from 4$^{th}$ production beam | 18.25 gsm |
| Total basis weight measured | 45.5 gsm |
| Average Fiber Dimension Measurements According To Fiber Dimension Test Method 1 | |
| Ribbon-shaped spunbond fibers from 1$^{st}$ production beam | 22.5 µm |
| Meltblown fibers from 2$^{nd}$ production beam | 1.5 µm |
| Meltblown fibers from 3$^{rd}$ production beam | 1.3 µm |
| Ribbon-shaped spunbond fibers from 4$^{th}$ production beam | 20.5 µm |

Example 16

Example 16 was made in the same manner as Example 15 with the exception that the bonding pattern B was used. The total basis weight measurement for Example 16 was the same total basis weight as Comparative Example 14. In addition, the individual S/M/M/S layers of Example 16 had the same basis weight calculations as Comparative Example 14, shown in Table 7. The average fiber dimension of the fibers made from beams 1, 2, 3, and 4 in Example 16 were measured using Fiber Dimension Test Method 1 and were the same as Example 15, shown above in Table 8.

Comparative Example 17

Comparative Example 17 was produced on a line having a single production beam fitted with a spinneret having capillaries with a round-cross-sectional geometry having a dimension d1 of 0.6 mm and an aspect ratio of 1.0:1.0. Comparative Example 17, thus, included a single spunbond layer including round-shaped spunbond fibers extruded from a isotactic homopolymer polypropylene resin having a MFR of about 35 g/10 min. The round-shaped spunbond fibers of Comparative Example 17 were produced at a throughout of about 128 kg per hours per meter width of the die productive area (kg/h/m). The round-shaped spunbond layer was bonded using an embossed roll having a bonding pattern known as Design #6396 provided by Overbeck & Co. GmbH of Krefeld, Germany. This pattern consisted of square diamond shaped pins having sides each having a length of 0.75 mm. The pins are present at a density of about 33.9 pin/cm$^2$, providing a pin contact surface area that covers about 19% of the total bonding surface of the embossed portion of the roll. Comparative Example 17 had a basis weight of about 17.5 gsm and included round-shaped spunbond fibers having a denier of about 1.9 based on dimension d1 of about 17.3 microns.

Example 18

Example 18 was also produced from the same polymer resin as Comparative Example 17 on the same production line, the same beam and same throughput, with the exception that production beam included a spinneret with capillaries having a ribbon-shaped cross-sectional geometry that is similar to the capillaries used for Sample 7-12 and 15-16. The resulting fabric included a ribbon-shaped spunbond layer of Example 18 was bonded with same embossing diamond pattern as Comparative Example 17 and had a basis weight calculation measured at about 17 gsm. The ribbon-shaped spunbond layer of Example 18 included ribbon-shaped spunbond fibers having a dimension d1 of 39 microns and a dimension d2 of 11 microns, measured according to Fiber Dimension Test Method 2 providing an aspect ratio of 3.55:1.

The processing conditions for Comparative Examples and Examples 1-16 are shown in Table 9. The test results for Comparative Examples and Examples 1, 3, 5, 7, 9, 11, 13 and 15 made using bonding pattern A are shown in Table 10. The test results for Comparative Examples and Examples 2, 4, 6, 8, 10, 12, 14 and 16 made using bonding pattern B are shown in Table 11. The test results for Comparative Example 17 and Example 18 are shown in Table 12.

Discussion of Results

When a nonwoven fabric is intended to be used in a personal hygiene product or as a component of a personal hygiene product, an important characteristic is its resistance to penetration by body exudates. Those body exudates are often of low surface tension due to their organic content; examples are runny bowel movement, blend of runny bowel movement and urine (e.g., such a blend is projected to have a 32 mN/m surface tension, as taught in U.S. Pat. No. 7,626,073 column 9, lines 9-12), or urine contaminated with lotion or other body exudates like blood or menstrual fluids. Therefore, a way to assess the liquid barrier capability of nonwoven fabric is to test them using the LSTST test described above. For such a nonwoven fabric, it is therefore desirable to achieve the highest LSTST-Time or the lowest LSTST-Flow possible. It is also desirable that such personal hygiene product is comfortable and breathable and thus, that the nonwoven fabric used in the personal hygiene product allows hot air and vapor moisture to pass through the nonwoven fabric. It is generally accepted that more movement of hot air and vapor moisture can occur through nonwoven fabrics having higher air permeability. However, for a typical nonwoven fabric having a layered S/M/M/S construction, an increase in air permeability is usually achieved at the expense of the liquid barrier performance or LSTST-Flow.

Comparative Examples 1-6 and Examples 7-12 had a total fabric basis weight measurement of about 13 gsm and included a meltblown fiber content of about 10% by weight of the total fabric basis weight. The S/M/M/S layered construction of Comparative Examples 1-6 and Examples 7-12 was typical of what is used as barrier leg cuff in baby diaper or adult incontinence products (as shown, e.g., in U.S. Pat. Appln. Publ. No. 2005/0215155 A1). The performance of Comparative Examples 1-6 and Examples 7-12 indicate the influence of the cross-section geometry and aspect ratio of the spunbond fibers and DCD on liquid barrier performance and air permeability. Comparative Examples 1-6 and Examples 7-12 were tested and measurements for air permeability and LSTST-Flow were obtained. The resulting measurements were used to calculate the Flow Ratio. The results are shown in Tables 10 and 11.

It was observed that by comparing Comparative Example 1 with Example 7 and comparing Comparative Examples 2 with Example 8, that Examples 7 and 8, which included two ribbon-shaped spunbond layers had a substantially lower Flow Ratio than equivalent Comparative Examples 1 and 2, which included two round-shaped spunbond layers. In addition, the comparison of Comparative Example 1 with Example 7 and the comparison of Comparative Example 2 with Example 8 also indicate that a lower Flow Ratio represents a more favorable balance between liquid barrier property and air permeability. Specifically, where air permeability is equal between nonwoven fabrics, a nonwoven fabric with a lower Flow Ratio will exhibit a better resistance to flow of low surface tension liquid. The same observation was made while comparing Comparative Example 3 with Example 9 and while comparing Comparative Examples 4 and Example 10.

Figure 6:
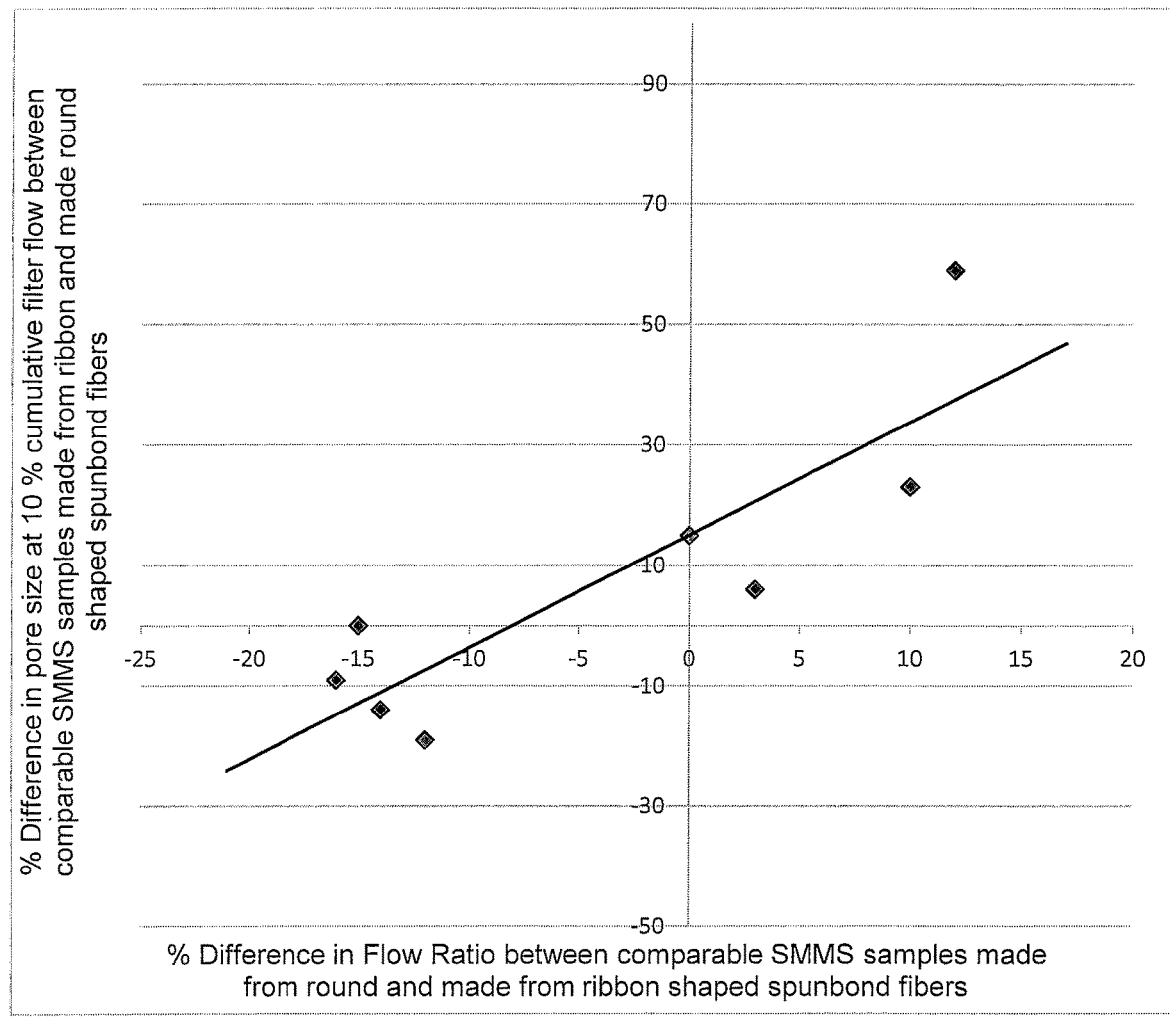
FIG. 6 illustrates the correlation between the difference in Flow Ratio and the difference in pore size at 10% cumulative filter flow for spunbond/meltblown/meltblown/spunbond (S/M/M/S) nonwoven fabrics made with ribbon-shaped spunbond fibers and round-shaped spunbond fibers, in accordance with descriptions in the Examples section herein.
Figure 7:
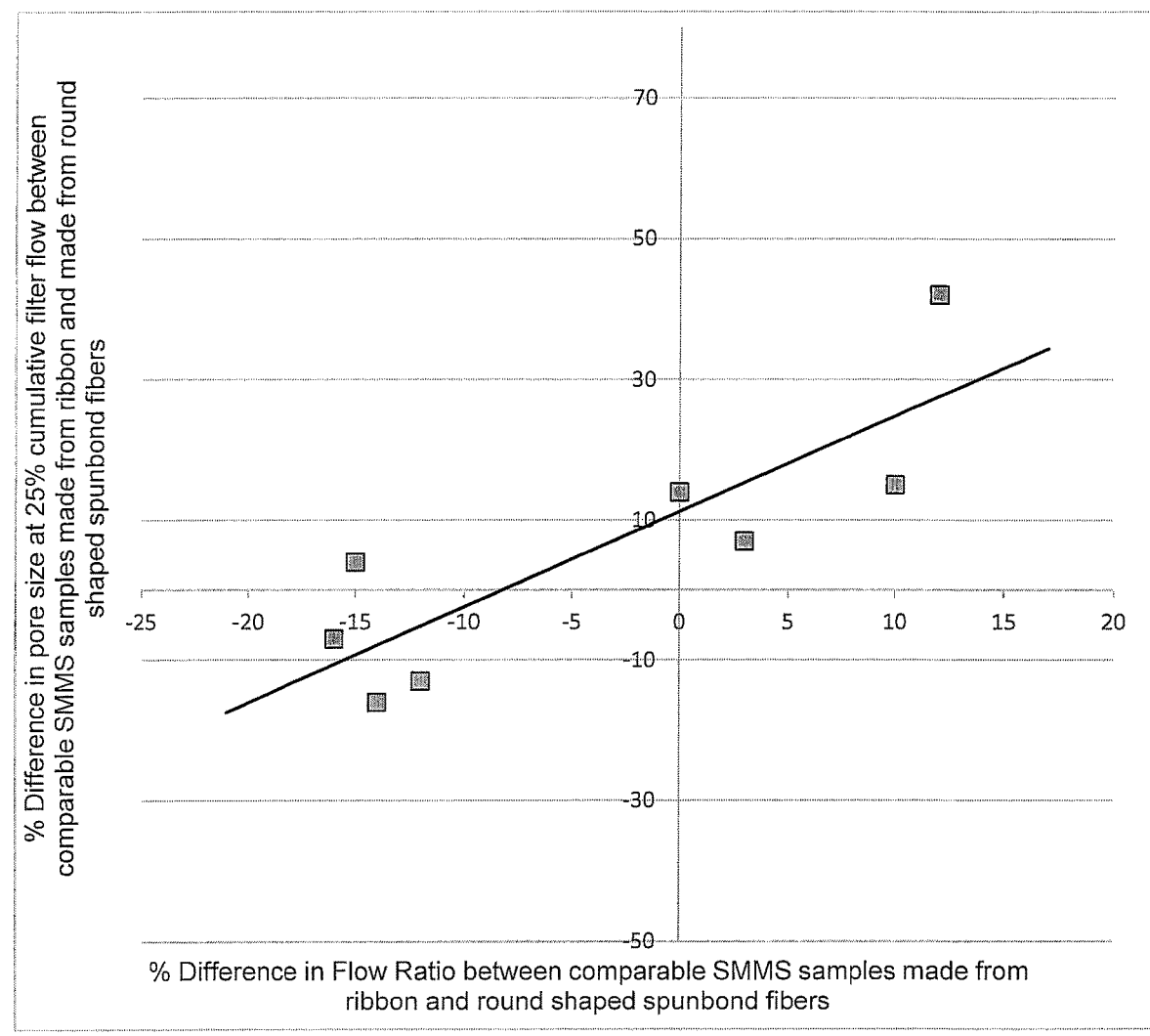
FIG. 7 illustrates the correlation between the difference in Flow Ratio and the difference in pore size at 25% cumulative filter flow for spunbond/meltblown/meltblown/spunbond (S/M/M/S) nonwoven fabrics made with ribbon-shaped spunbond fibers and round-shaped spunbond fibers in accordance with descriptions in the Examples section herein.

It is noted that the observation that a lower Flow Ratio represents a more favorable balance between liquid barrier property and air permeability described above in nonwoven fabrics that included two ribbon-shaped spunbond layers did not appear to materialize when comparing Comparative Example 5 with Example 11 and when comparing Comparative Examples 6 with Example 12. It is thought that the lower Flow Ratio results observed for Examples 7-10, which included meltblown layers formed using production beams having a DCD of 110 mm and 150 mm, was due to ability of meltblown fibers formed at the lower DCD to form a more compact and better supported web when deposited on a first ribbon-shaped spunbond layer and covered by a second ribbon-shaped spunbond layer. In particular, it is thought that the meltblown fibers form a more compact web when disposed between the two ribbon-shaped spunbond layers than when the meltblown fibers are disposed between two round-shaped spunbond layers. The more compact web that is formed should result in a slight downward shift in pore size distribution for the high side of the pore size distribution curve at 10% and 25% cumulative filter flows, indicating a lower number of larger pores or a lower fraction of larger pores in the pore distribution curve. The more compact web is also thought to lower the ability for the liquid to travel within the X-Y plane of the meltblown layer after the liquid enters the fabric along the Z-axis, which is oriented perpendicular to a major surface of the fabric. In general, a correlation was observed between the improvement or degradation of the Flow Ratio and the difference in pore size measured at 10% and 25% cumulative filter flow (see, e.g., FIGS. 6 and 7). It is thought that the presence of larger pores have the greatest impact on the flow of low surface tension liquid through the fabric. Accordingly, as the number of larger pores increases, the LSTST-Flow measurement also increases.

It also was observed that the difference in Flow Ratio, as well as the reduction in pore size at 10% and 25% cumulative filter flow, becomes more favorable as the DCD is reduced. These results are shown in Tables 10 and 11. Based on these observations, it is thought that the level of energy at which the meltblown fibers are projected toward the underlying layer influence the liquid barrier performance of a fabric. At a lower DCD, a more compact web is formed by meltblown fiber than at high DCD, which is attributed to the difference in kinetic energy remaining when the fibers reach the forming surface. It was thought that at the process conditions used for Examples 11-12, including meltblown fibers formed at a DCD of 190 mm, the kinetic energy of the meltblown fibers reaching underlying ribbon-shaped spunbond layer was so low or attenuated that it formed a bulkier and less uniform web that did not benefit from the flatter surface offered by the first ribbon-shaped spunbond layers of Examples 7-10.

Comparative Examples 13-14 and Examples 15-16 were compared to investigate the impact of the cross-sectional geometry and aspect ratio of the spunbond fibers and bonding pattern on heavier nonwoven fabrics that contain a higher percentage of meltblown fibers. By comparing Comparative Example 13 with Example 15 and Comparative Examples 14 with Example 16, no significant benefit was observed in regard to Flow Ratio. It is thought that as the amount of meltblown fiber was increased, the impact of the cross-sectional geometry and aspect ratio of the spunbond fibers is diminished.

It was observed from the data collected in Tables 10 and 11 for Comparative Examples 1 to 6, Example 7 to 12, Comparative Examples 13-14 and Example 15-16, that the relative benefit in Flow Ratio attributed to the use of ribbon-shaped spunbond fibers rather than round-shaped spunbond fibers for was not largely influence by the bonding pattern used.

In another experiment, Comparative Example 17 and Example 18 were produced to compare spunbond layers made from round-shaped spunbond fibers with spunbond layers made from ribbon-shaped spunbond fibers. The air permeability, LSTST, and flow ratio results for Comparative Example 17 and Example 18 are shown in Table 12. Example 18 did not exhibit an advantage in regard to Flow Ratio when compared to Comparative Example 17. Based on this observation, it is believed that the lower Flow Ratio representing a more favorable balance between liquid barrier property and air permeability discussed above is not due to the ribbon-shaped spunbond fibers or layers alone, but is rather due to the combination of ribbon-shaped spunbond layer and a layer of meltblown fibers.

The results have shown the unexpected findings that nonwoven fabrics can benefit in regard to Flow Ratio by incorporating ribbon-shaped spunbond fibers rather than round-shaped spunbond fibers in a layered construction with meltblown layers. In addition, the results have shown the unexpected findings that nonwoven fabrics can benefit in regard to Flow Ratio when the meltblown layer is designed to provide a nonwoven fabric that has a pore size measured at 10% of cumulative filter flow of no more than about 27 microns. Moreover, it is believed that providing a nonwoven fabric with a total content of meltblown fibers that is tailored to avoid forming an excessively tight structure can enhance the benefits of ribbon-shaped spunbond layers made of ribbon-shaped spunbond fibers.

TABLE 9

| | | Comparative Examples and Examples | | | | | | | |
|---|---|---|---|---|---|---|---|---|---|
| | | 1 & 2 | 7 & 8 | 3 & 4 | 9 & 10 | 5 & 6 | 11 & 12 | 13 & 14 | 15 & 16 |
| Shape of spunbond fibers | | Round | Ribbon | Round | Ribbon | Round | Ribbon | Round | Ribbon |
| Throughput for 1$^{st}$ and 4$^{th}$ beams producing the spunbond fiber layers | Kg/h (1) | 169/171 | 167/171 | 169/171 | 167/171 | 169/171 | 167/171 | 174/176 | 172/176 |
| Throughput for 2$^{nd}$ and 3$^{rd}$ beams producing the meltblown fibers | Kg/h (1) | 18/19 | 19/19 | 18/19 | 19/19 | 18/19 | 19/19 | 43/43 | 43/43 |

TABLE 9-continued

|  |  | Comparative Examples and Examples | | | | | | | |
|---|---|---|---|---|---|---|---|---|---|
|  |  | 1 & 2 | 7 & 8 | 3 & 4 | 9 & 10 | 5 & 6 | 11 & 12 | 13 & 14 | 15 & 16 |
| Line speed | meters/min | 449 | 449 | 449 | 449 | 449 | 449 | 150 | 150 |
| Distance from die to collector (DCD for meltblown $2^{nd}$ and $3^{rd}$ beams) | mm | 110/110 | 110/110 | 150/150 | 150/150 | 190/190 | 190/190 | 180/200 | 180/200 |

(1) The productive length of the spinneret was about 1.1 meter

TABLE 10

TEST RESULTS FOR COMAPRATIVE EXAMPLES AND EXAMPLES MADE USING THE BONDING PATTERN A

|  | Comparative Examples and Examples | | | | | | | |
|---|---|---|---|---|---|---|---|---|
|  | 1 | 7 | 3 | 9 | 5 | 11 | 13 | 15 |
| Shape of spunbond fibers | Round | Ribbon | Round | Ribbon | Round | Ribbon | Round | Ribbon |
| DCD for the meltblown $2^{nd}$ and $3^{rd}$ beams (mm) | 110/110 | 110/110 | 150/150 | 150/150 | 190/190 | 190/190 | 180/200 | 180/200 |
| Basis weight (gsm) | 13.2 | 13.5 | 13.1 | 13.8 | 13 | 12.9 | 45.5 | 45.5 |
| Air Permeability for a single ply ($m^3/m^2/min$) | 40 | 37.5 | 50 | 50 | 56 | 58 | 7.25 | 6.35 |
| LSTST-Time measured on single ply sample (second) | — | — | — | — | — | — | 38 | 42 |
| LSTST-Flow for single-ply measurement (ml/sec) | — | — | — | — | — | — | 0.132 | 0.119 |
| Flow Ratio for single-Ply measurement | — | — | — | — | — | — | 0.018 | 0.019 |
| Difference in Flow Ratio for ribbon vs. round filament samples tested as single ply |  |  |  |  |  |  | 3% | |
| Air Permeability for two plies ($m^3/m^2/min$) | 21.5 | 17 | 24 | 20.5 | 27.5 | 22.5 | — | — |
| LSTST-Time measured on two plies of sample(second) | 9.4 | 14.2 | 9.4 | 12.8 | 9.1 | 10.1 | — | — |
| LSTST-Flow for two-plies measurement (ml/sec) | 0.53 | 0.35 | 0.53 | 0.39 | 0.55 | 0.50 | — | — |
| Flow Ratio for two-plies measurement | 0.0247 | 0.0207 | 0.0222 | 0.0191 | 0.0200 | 0.0220 | — | — |
| Difference in Flow Ratio for ribbon vs. round filament samples tested as two plies | −16% | | −14% | | 10% | | | |
| Pore size at 10% cumulative filter flow (micron) | 16 | 14.5 | 22 | 19 | 26 | 30 | 8.5 | 9 |
| Pore size at 25% cumulative filter flow (micron) | 14.5 | 13.5 | 19 | 16 | 20 | 23 | 7.5 | 8 |

TABLE 11

TEST RESULTS FOR COMPARATIVE EXAMPLES AND EXAMPLES MADE USING THE BONDING PATTERN B

|  | Comparative Examples and Examples | | | | | | | |
|---|---|---|---|---|---|---|---|---|
|  | 2 | 8 | 4 | 10 | 6 | 12 | 14 | 16 |
| Shape of spunbond fibers | Round | Ribbon | Round | Ribbon | Round | Ribbon | Round | Ribbon |
| DCD for the meltblown $2^{nd}$ and $3^{rd}$ beams (mm) | 110/110 | 110/110 | 150/150 | 150/150 | 190/190 | 190/190 | 180/200 | 180/200 |
| Basis weight (gsm) | 13.2 | 13.5 | 13.1 | 13.8 | 13 | 12.9 | 45.5 | 45.5 |
| Air Permeability for a single ply ($m^3/m^2/min$) | 38 | 33 | 46 | 39 | 53 | 48.5 | 6.6 | 6.2 |
| LSTST-Time measured on single ply sample (second) | — | — | — | — | — | — | 32 | 34 |
| LSTST-Flow for single-ply measurement (ml/sec) | — | — | — | — | — | — | 0.156 | 0.147 |

TABLE 11-continued

TEST RESULTS FOR COMPARATIVE EXAMPLES AND EXAMPLES MADE USING THE BONDING PATTERN B

| | Comparative Examples and Examples | | | | | | | |
|---|---|---|---|---|---|---|---|---|
| | 2 | 8 | 4 | 10 | 6 | 12 | 14 | 16 |
| Flow Ratio for single-Ply measurement | — | — | — | — | — | — | 0.024 | 0.024 |
| Difference in Flow Ratio for ribbon vs. round filament samples tested as single ply | | | | | | | 0% | |
| Air Permeability for two plies (m³/m²/min) | 19.5 | 15.5 | 22 | 18 | 25.5 | 19 | 3.1 | 2.45 |
| LSTST-Time measured on two plies of sample(second) | 10.2 | 15.1 | 9.9 | 13.8 | 9.2 | 11 | | |
| LSTST-Flow for two-plies measurement (ml/sec) | 0.49 | 0.33 | 0.51 | 0.36 | 0.54 | 0.45 | | |
| Flow Ratio for two-plies measurement | 0.0251 | 0.0214 | 0.0230 | 0.0201 | 0.0213 | 0.0239 | | |
| Difference in Flow Ratio for ribbon vs. round filament samples tested as two plies | −15% | | −12% | | 12% | | | |
| Pore size at 10% cumulative filter flow (micron) | 14.5 | 14.5 | 25 | 21 | 22 | 35 | 8 | 9.2 |
| Pore size at 25% cumulative filter flow (micron) | 13.5 | 13 | 19 | 16.5 | 19 | 27 | 7.1 | 8.1 |

TABLE 12

| | Comparative Example and Example | |
|---|---|---|
| | 17 | 18 |
| Shape of spunbond fibers | Round | Ribbon |
| Basis weight (gsm) | | |
| Air Permeability for a single ply (m³/m²/min) | 235 | 165 |
| Air Permeability for two plies (m³/m²/min) | 125 | 90 |
| LSTST-Time measured on two plies of sample(second) | 4 | 5.2 |
| LSTST-Flow for two-plies measurement (ml/sec) | 1.25 | 0.96 |
| Flow Ratio for two-plies measurement | 0.0100 | 0.0107 |
| Difference in ratio for ribbon vs. round filament samples tested as two plies | 7% | |

Unless indicated otherwise, all amounts, percentages, ratios and the like used herein are by weight. When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A nonwoven personal hygiene component comprising:
   a first ribbon-shaped spunbond layer comprising first ribbon-shaped continuous filaments;
   a second ribbon-shaped spunbond layer comprising second ribbon-shaped continuous filaments; and
   a meltblown layer comprising meltblown fibers is disposed between said first ribbon-shaped spunbond layer and said second ribbon-shaped spunbond layer;
   wherein at least one of the first ribbon-shaped spunbond layer, the second ribbon-shaped spunbond layer and the meltblown layer comprise polypropylene,
   wherein said meltblown layer has a basis weight from 2 gsm to not greater than about 5 gsm,
   wherein said meltblown layer consists of (i) from 1% to 10% by weight of non-ribbon shaped meltblown fibers, and (ii) ribbon-shaped meltblown fibers, and
   wherein said nonwoven personal hygiene component has a basis weight of at least 8 gsm and not greater than about 40 gsm, a pore size of about 14.5 microns to less than or equal to about 21 microns when measured at 10% of cumulative filter flow, a low surface tension liquid strike through flow of less than 0.9 ml per second, an air permeability of at least 10 m³/m²/min. and a ratio of low surface tension liquid strike through flow to air permeability of greater than or equal to 0.016 and less than or equal to 0.021;
   wherein the meltblown layer has been deposited directly onto the second ribbon-shaped spunbond layer from at least one die having a die-to-collector distance from about 110 mm to about 150 mm.

2. The nonwoven personal hygiene component of claim 1, wherein said nonwoven personal hygiene component has a basis weight of at least 8.5 gsm and not greater than about 30 gsm.

3. The nonwoven personal hygiene component of claim 1, wherein said meltblown layer has a basis weight of at least 3 gsm and no greater than about 4 gsm.

4. The nonwoven personal hygiene component of claim 3, wherein the nonwoven personal hygiene component has a basis weight of at least 11 gsm and not greater than about 25 gsm.

5. The nonwoven personal hygiene component of claim 1, wherein said first spunbond layer, said second spunbond layer and said meltblown layer are bonded together by a plurality of discrete bond areas.

6. The nonwoven personal hygiene component of claim 1, wherein the meltblown layer further comprises multiple directly adjoining meltblown layers present as a stack, wherein first and second outer sides of the stack are in direct contact with the first and second ribbon-shaped spunbond layers.

7. The nonwoven personal hygiene component of claim 1, wherein said nonwoven personal hygiene component has a surface area and said first spunbond layer, said second spunbond layer and said meltblown layer are thermally bonded together to form a plurality of bond points, wherein said plurality of bond points comprise up to about 25% of said surface area of said nonwoven personal hygiene component.

8. The nonwoven personal hygiene component of claim 1, wherein at least one of said first ribbon-shaped spunbond layer and said second ribbon-shaped spunbond layer comprises fibers having a cross-section with an aspect ratio of at least 2.5:1 and no great than about 7:1.

9. The nonwoven personal hygiene component of claim 8, wherein said nonwoven personal hygiene component has a pore size of less than or equal to about 23 microns when measured at 25% of cumulative filter flow.

10. The nonwoven personal hygiene component of claim 1, wherein the first ribbon-shaped continuous filaments are homogenous solid filaments, and the second ribbon-shaped continuous filaments are homogenous solid filaments.

11. The nonwoven personal hygiene component of claim 1, wherein said nonwoven personal hygiene component has a low surface tension liquid strike through flow of less than 0.4 ml per second and a ratio of low surface tension liquid strike through flow to air permeability of greater than or equal to 0.019 and less than or equal to 0.021.

12. The nonwoven personal hygiene component of claim 1, wherein the first ribbon-shaped spunbond layer has a basis weight of at least 3.9 gsm and not greater than about 11.5 gsm, and the second ribbon-shaped spunbond layer has a basis weight of at least 3.9 gsm and not greater than about 11.5 gsm.

13. The nonwoven personal hygiene component of claim 1, wherein each of said first ribbon-shaped spunbond layer and second ribbon-shaped spunbond layer comprise at least about 90% by weight ribbon-shaped filaments.

14. The nonwoven personal hygiene component of claim 1, wherein the meltblown layer comprises multiple directly adjoining meltblown sub-layers.

15. The nonwoven personal hygiene component of claim 1, wherein said nonwoven personal hygiene component has a surface area, and said first ribbon-shaped spunbond layer, said second ribbon-shaped spunbond layer, and said meltblown layer are thermally bonded together to form a plurality of bond points, wherein said plurality of bond points comprise from about 10% to about 25% of said surface area of said nonwoven personal hygiene component.

* * * * *

UNITED STATES PATENT AND TRADEMARK OFFICE
CERTIFICATE OF CORRECTION

| | |
|---|---|
| PATENT NO. | : 11,274,384 B2 |
| APPLICATION NO. | : 13/205268 |
| DATED | : March 15, 2022 |
| INVENTOR(S) | : Carlton F. Dwiggins et al. |

It is certified that error appears in the above-identified patent and that said Letters Patent is hereby corrected as shown below:

In the Claims

In Column 36, Line 49, in Claim 1, "second, an air permeability of at least 10 $m^3/m^2$/min." should read --second, an air permeability of at least 10 $m^3/m^2$/min--.

In Column 37, Line 24, in Claim 8, "least 2.5:1 and no great than about 7:1." should read --least 2.5:1 and no greater than about 7:1.--.

Signed and Sealed this
Nineteenth Day of July, 2022

Katherine Kelly Vidal
*Director of the United States Patent and Trademark Office*